(12) United States Patent
Jain et al.

(10) Patent No.: US 11,574,455 B1
(45) Date of Patent: Feb. 7, 2023

(54) GENERATION AND IMPLEMENTATION OF 3D GRAPHIC OBJECT ON SOCIAL MEDIA PAGES

(71) Applicant: Emoji ID, LLC, Oakland, CA (US)

(72) Inventors: Naveen Kumar Jain, Nashville, TN (US); Riccardo Paolo Spagni, Western Cape (ZA)

(73) Assignee: EMOJI ID, LLC, Oakland, CA (US)

( * ) Notice: Subject to any disclaimer, the term of this patent is extended or adjusted under 35 U.S.C. 154(b) by 0 days.

(21) Appl. No.: 17/658,745

(22) Filed: Apr. 11, 2022

Related U.S. Application Data

(60) Provisional application No. 63/267,140, filed on Jan. 25, 2022.

(51) Int. Cl.
| | |
|---|---|
| *G06T 19/20* | (2011.01) |
| *G06Q 20/36* | (2012.01) |
| *G06T 13/40* | (2011.01) |
| *G06T 13/80* | (2011.01) |
| *G06Q 50/00* | (2012.01) |
| *G06Q 20/12* | (2012.01) |
| *G06Q 20/38* | (2012.01) |

(52) U.S. Cl.
CPC ......... *G06T 19/20* (2013.01); *G06Q 20/1235* (2013.01); *G06Q 20/36* (2013.01); *G06Q 20/3829* (2013.01); *G06Q 50/01* (2013.01); *G06T 13/40* (2013.01); *G06T 13/80* (2013.01); *G06Q 2220/00* (2013.01); *G06T 2219/2016* (2013.01)

(58) Field of Classification Search
CPC ......... G06T 19/20; G06T 13/40; G06T 13/80; G06T 2219/2016; G06Q 20/1235; G06Q 20/36; G06Q 20/3829; G06Q 50/01; G06Q 2220/00
See application file for complete search history.

(56) References Cited

U.S. PATENT DOCUMENTS

| | | | | |
|---|---|---|---|---|
| 8,024,581 | B2 * | 9/2011 | Spalka | H04L 9/3066 726/28 |
| 10,672,165 | B1 * | 6/2020 | Baron | G06T 19/006 |
| 2009/0249254 | A1 * | 10/2009 | Walker | G06F 16/954 707/999.005 |
| 2010/0048290 | A1 * | 2/2010 | Baseley | A63F 13/655 463/31 |
| 2011/0145327 | A1 * | 6/2011 | Stewart | G06F 16/4387 709/217 |

(Continued)

*Primary Examiner* — Phong X Nguyen
(74) *Attorney, Agent, or Firm* — Perkins Coie LLP; Colin Fowler

(57) ABSTRACT

Disclosed herein is digital object generator that builds unique digital objects based on the user specific input. The unique digital objects are part of a graphic presentation to users. The user specific input is positioned on pre-configured regions of a 3D object such as a polygon. Examples of the pre-configured regions include faces of the 3D object, orbits around the 3D object, or identifiable regions associated with the 3D object. The 3D object is rendered as a part of a social media page and enables social interactions between users. In the social media page, the 3D object rotates displaying regions/faces to page visitors. In some embodiments, the 3D object is implemented as a pet or companion of a user avatar in a virtual, augmented, or extended reality space.

22 Claims, 18 Drawing Sheets

(56) References Cited

U.S. PATENT DOCUMENTS

| | | | | |
|---|---|---|---|---|
| 2012/0127284 | A1* | 5/2012 | Bar-Zeev | G06T 19/006 |
| | | | | 348/158 |
| 2012/0282995 | A1* | 11/2012 | Allen | G06Q 30/0214 |
| | | | | 463/22 |
| 2014/0244494 | A1* | 8/2014 | Davis | G06Q 20/36 |
| | | | | 705/41 |
| 2015/0093048 | A1* | 4/2015 | Smith | G06Q 20/12 |
| | | | | 382/306 |
| 2015/0356787 | A1* | 12/2015 | Abe | G06F 3/0304 |
| | | | | 345/633 |
| 2020/0023269 | A1* | 1/2020 | Marchesi | A63F 13/92 |
| 2020/0082389 | A1* | 3/2020 | Regev | G06Q 20/105 |
| 2020/0094134 | A1* | 3/2020 | Marchesi | A63F 13/213 |
| 2020/0118111 | A1* | 4/2020 | Folayan | G07F 9/023 |
| 2021/0279695 | A1* | 9/2021 | Rice | G06F 3/0488 |
| 2021/0374722 | A1* | 12/2021 | Gower | G06Q 20/36 |
| 2022/0000442 | A1* | 1/2022 | Sakuragi | G06T 19/00 |
| 2022/0058633 | A1* | 2/2022 | Yantis | G06Q 20/3676 |
| 2022/0237574 | A1* | 7/2022 | Gomez | G06Q 20/40145 |
| 2022/0300954 | A1* | 9/2022 | Paler | G06Q 20/3678 |

* cited by examiner

GENERATION AND IMPLEMENTATION OF 3D GRAPHIC OBJECT ON SOCIAL MEDIA PAGES

TECHNICAL FIELD

The disclosure relates to digital input handling and processing to generate digital composite objects. The disclosure more specifically relates to unique, procedurally generated digital objects in a 3D space.

BACKGROUND

A computer can use random elements to generate unique, or seemingly unique, procedurally generated digital objects (e.g., graphics). However, human viewers typically do not appreciate something as unique if it is merely random. Thus, procedural generation of digital objects is lacking in programming to interpret when output is merely random or when it has displayed machine creativity. Prior art has attempted to address the randomness issue by providing a set of preset components that are easily intermingled. However, this solution is limited to combinations of presets and thus repeats, or near-repeat digital objects as output are likely.

Tangentially, a one-way function is a function that is easy to compute on every input, but hard to invert given the image of a random input. Here, "easy" and "hard" are to be understood in the sense of computational complexity theory, specifically the theory of polynomial time problems.

DETAILED DESCRIPTION

Figure 1:
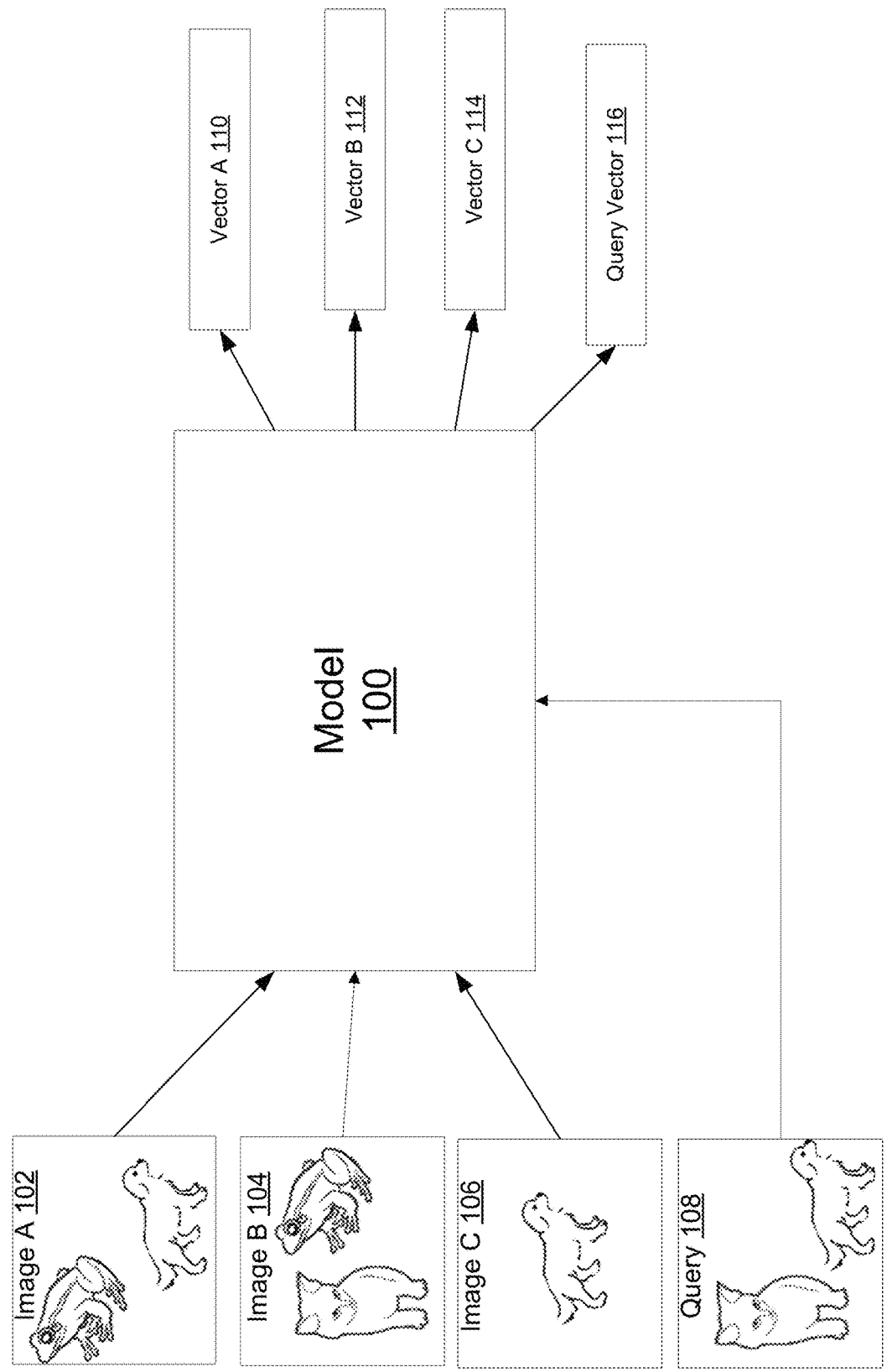
FIG. 1 is an illustration of a sample few-shot model configured to derive graphic features.

Disclosed herein is a generator of unique, procedurally generated digital objects that makes use of user specific parameters. Computers can generate unique digital output quite easily through the use randomizing elements. This type of output results in something that is strictly unique or seemingly unique, but a human viewer is not necessarily going to appreciate the output as unique. Depending on the style of the output, the uniqueness manifests in different ways. For purposes of ease of disclosure, this application largely focuses on graphical elements, but textual, audio, or multimedia elements are similarly implementable.

Prior art techniques have made use of preset elements that are reused in a random order. This sort of process is ultimately subject to the size of the presets used, but nevertheless, often appears to output similar digital objects over time. A way to overcome the similarity between output is to unbound the input such that each user is able to submit their own input, based on user specific parameters. While the algorithm for generating the procedural digital object does not change, the varied input enables more unique objects to be created. Further, the digital objects created are more personalized to those who instigate the generation.

With respect to user submitted input on "unique" output, a platform needs a scheme to address the potential of double submission of the same input. In some embodiments, input is validated such that an exact set of input may only be submitted once. In some embodiments, a user is validated such that that user may only submit input once (and in a manner, the user themselves acts as the variation in input). In some embodiments, a randomization element is applied to each submission. The randomization element (e.g., a salt) is implementable in a number of ways. In some embodiments, the salt changes the manner of procedural generation based on the input. In some embodiments, the salt is treated in the same manner as the input and acts an additional element of input.

A specific example of an embodiment of the present invention relates to the generation of cryptographic tokens, or more specifically non-fungible cryptographic tokens (NFT). In some embodiments, the procedurally generated digital object is generated based on existing elements in a cryptographic wallet. A given cryptographic wallet has a number of NFTs present therein. The generator of digital objects interprets the various cryptographic protocols related to the NFTs present in the wallet, identifies content associated therewith, and procedurally generates a new NFT based on the existing ones present in the wallet.

Examples of uses of digital objects include as collectors items, tickets for events, identity information, art, and/or social networking or community building tokens.

Artificial Intelligence and Few-Shot Models

Artificial intelligence models often operate based on extensive and enormous training models. The models include a multiplicity of inputs and how each should be handled. Then, when the model receives a new input, the model produces an output based on patterns determined from the data it was trained on. Few-shot models use a small number of inputs (a support set) to identify some information about a query input.

The term "few-shot" refers to a model that is trained to interpret a few sources of input data that the model has not necessarily observed before. Few-shot is shorthand for stating that the model has "a few shots" to determine what the user is seeking. "A few" does not necessarily refer to "three" as is often applied, but a relatively small number when compared to other models known in the art. Few-shot learning (FSL) refers to the training of ML algorithms using a very small set of training data (e.g., a handful of images), as opposed to the very large set that is more often used. This commonly applies to the field of computer vision, where it is desirable to have an object categorization model work well without thousands of training examples.

FSL is utilized in the field of computer vision, where employing an object categorization model still gives appropriate results even without having several training samples. For example, where a system categorizes bird species from photos, some rare species of birds may lack enough labeled pictures to be used as training images. Consequently, if there is a classifier for bird images, with the insufficient amount of the dataset, a solution would employ FSL.

In some embodiments, a few-shot model uses 10 or fewer input examples, 20 or fewer, 100 or fewer input examples, or 5-7 input examples. When applied to graphic element/feature identification, the number of input examples may be directly correlated with the number of graphic features that are possible in queries. The referenced input examples differ from those the model is trained with in that those examples used during the few-shot do not necessarily have any relationship (with the exception of having a comparable data type, like the use of ASCII characters, or image data). The training of the model is premised in teaching the model how to quickly adapt to new training examples, rather than to recognize a given input strictly based on examples that it has seen during training. Rather than evaluate individual inputs, the few-shot model is trained to evaluate few-shots—specifically relationships that exist between the various examples within the few-shot.

Previous work on FSL requires that each example in the support set (examples for the model to adapt quickly to) contain only a single label. For example, suppose a model can quickly learn to classify images of a rare bird species. Prior work requires that each image in the support set contain a single bird. Other work relating to few-shot models and relation network models include the following references:

Yutian Chen, Yannis M. Assael, Brendan Shillingford, David Budden, Scott E. Reed, Heiga Zen, Quan Wang, Luis C. Cobo, Andrew Trask, Ben Laurie, Çaglar Gülçehre, Aäron van den Oord, Oriol Vinyals, and Nando de Freitas. *Sample Efficient Adaptive Text-to-Speech*. CoRR, abs/1809.10460, 2018.

Chelsea Finn, Pieter Abbeel, and Sergey Levine. *Model-Agnostic Metalearning for Fast Adaptation of Deep Networks*. CoRR, abs/1703.03400, 2017.

Gregory R. Koch. Siamese Neural Networks for One-Shot Image Recognition. 2015.

Scott E. Reed, Yutian Chen, Thomas Paine, Aaron van den Oord, S. M. Ali Eslami, Danilo Jimenez Rezende, Oriol Vinyals, and Nando de Freitas. *Few-shot Autoregressive Density Estimation: Towards Learning to Learn Distributions*. CoRR, abs/1710.10304, 2017.

Florian Schroff, Dmitry Kalenichenko, and James Philbin. *Facenet: A Unified Embedding for Face Recognition and Clustering*. CoRR, abs/1503.03832, 2015.

Flood Sung, Yongxin Yang, Li Zhang, Tao Xiang, Philip H. S. Torr, and Timothy M. Hospedales. *Learning to Compare: Relation Network for Few-shot Learning*. CoRR, abs/1711.06025, 2017.

Oriol Vinyals, Charles Blundell, Timothy P. Lillicrap, Koray Kavukcuoglu, and Daan Wierstra. *Matching Networks for One Shot Learning*. CoRR, abs/1606.04080, 2016.

Few-shot models typically make use of convolutional neural networks pre-trained for feature extraction. Pretraining includes a large amount of media training data. Output of the pretraining model is a set of vectors. Training for such a network may implement supervised learning or with a Siamese network. Different manners of training will affect output prediction accuracy. The output vectors are normalized in order to establish a common output type for purposes of comparison.

FIG. 1 is an illustration of a sample few-shot model 100 configured to derive graphic features. The sample illustrated is a simplistic implementation utilizing relatively few, and easy to recognize graphic features. This disclosure is not limited to such simple implementations and the relevant models may be configured to operate and identify more complex sets of graphic features.

In the example, model 100, is a few-shot model designed to identify and categorize graphic features that are received. In some embodiments, the model 100 is configured with a set list of graphic features to observe (indicated by a graphic feature matrix). In other embodiments, Model 20 includes no explanation what a support set includes and instead merely identifies similar patterns in pixels.

The illustration of FIG. 1 includes a three-image support set 102, 104, 106 and a single query image 108. The images include some combination of three graphical features depicting a frog, a cat, or a dog. When each image 102, 104, 106, 108 is supplied to the model 100, the model 100 generates a respective vector that describes the image content. Each vector 110, 112, 114, 116 includes a set of dimensions that together are indicative of the graphic content of the images 102, 104, 106, 108. Image A 102 corresponds to vector A 110. Image B 104 corresponds to vector B 112. Image C 106 corresponds to vector C 114. The query image 108 corresponds to the query vector 116. In some embodiments, the support set vectors 110, 112, 114 and the query vector 116 are a predetermined number of dimensions in length. Dimensions may relate directly to graphical features on a one-to-one basis, or multiple dimensions may be used to describe a given graphic feature.

As depicted in the figure, the query image 108 does not include a combination of graphic features that exist in any of the support set. Each feature exists in the support set, but not necessarily by itself, or with an exact same combination. While a human observer can readily identify the content of the query image, the image identification system is taught how to identify via few-shot models.

References to "a model" as discussed herein may refer to a heuristic model, an artificial intelligence model, a neural network, a convolutional neural network, a hidden Markov model, an FSL model, or another suitable ML model known in the art.

Cryptographic Platforms

Public and private keys are an integral component of cryptocurrencies built on blockchain networks and are part of a larger field of cryptography known as public-key cryptography (PKC) or asymmetric encryption. The goal of PKC is to easily transition from a first state (e.g., a private key) to a second state (e.g., a public key) while reversing the transition from the second state to the first state nearly impossible, and in the process, proving possession of a secret key without exposing that secret key. The product is subsequently a one-way mathematical function, which makes it ideal for validating the authenticity of transactions such as cryptocurrency transactions because possession of the first state such as the secret key cannot be forged. PKC relies on a two-key model, the public and private key.

The general purpose of PKC is to enable secure, private communication using digital signatures in a public channel that is susceptible to potentially malicious eavesdroppers. In the context of cryptographic tokens, the goal is to prove that a traded token was indeed signed by the owner of that token, and was not forged, all occurring over a public blockchain network between peers. A private key of a blockchain wallet unlocks the right for the blockchain wallet's owner to spend transfer tokens in the blockchain wallet and therefore must remain private. A wallet address of the blockchain wallet is cryptographically linked to the blockchain wallet's private key and is publicly available to all users to enable other users to send NFTs to the user's blockchain wallet. For example, the wallet address may be a public key generated from the blockchain wallet's private key using one or more PKC algorithms. Public keys are generally used to identify wallets, whereas the private keys are used to authorize actions of the respective wallet.

Wallet addresses for blockchain wallets are typically represented in human-legible form in one of three ways: as a hexadecimal representation, as a Base64 representation, or as a Base58 representation. In each of these common ways of representing the wallet addresses, each wallet address is represented using a string of letters and numbers, typically exceeding 20 characters in length. The length and randomness of the alphanumeric string makes the wallet address unwieldy and difficult to remember, thereby decreasing its usability and hindering the adoption of cryptocurrencies.

Structurally, in some embodiments, customized, flexible cryptographic tokens connected to a smart contract are powered by a less flexible, base cryptocurrency. Miners operating on the network for the base cryptocurrency power execution of a distributed application (dApp) or smart contract. The smart contract is held by an administrative user and includes all of the custom cryptographic tokens. The custom cryptographic tokens do not "move" in the same sense that the base cryptocurrency moves via transactions. The smart contract is "held" by the administrative user though secondary users may interact with the smart contract and various portions (specific tokens) may be attributed to those secondary users.

Figure 2:
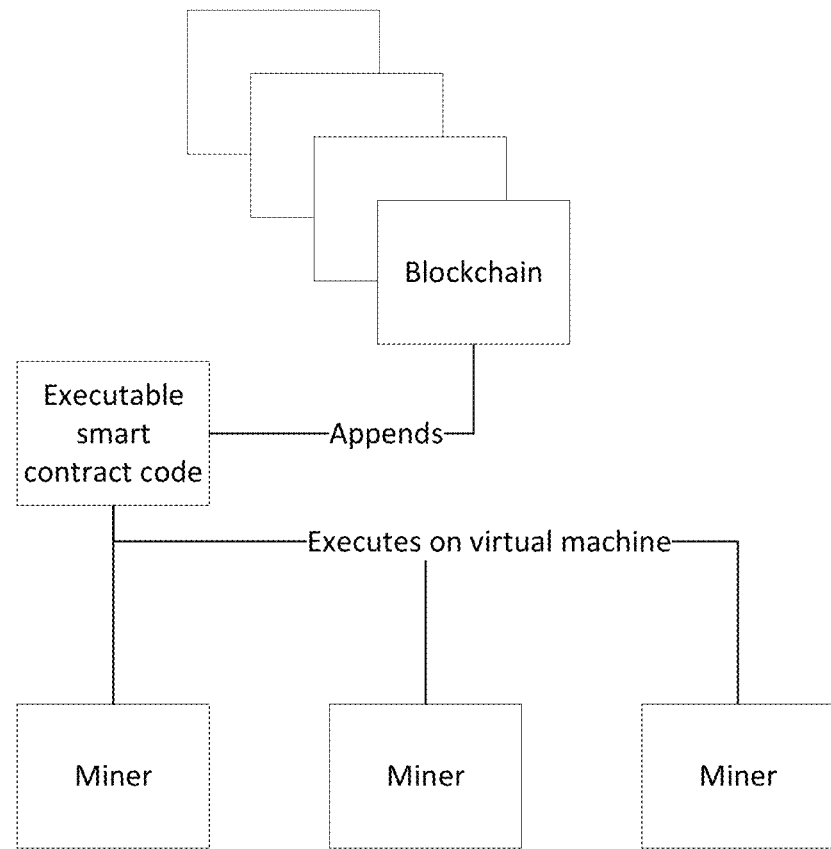
FIG. 2 is a block diagram illustrating a data structure of a smart contract.

FIG. 2 is a block diagram illustrating a data structure of a smart contract. Smart contracts and dApps execute on an Ethereum virtual machine ("EVM"). The EVM is instantiated on available network nodes. Smart contracts and dApps are applications that execute; thus, the processing power to do so must come from hardware somewhere. Nodes must volunteer their processors to execute these operations based on the premise of being paid for the work in Ethereum coins, referred to as Ether, measured in "gas." Gas is the name for a unit of work in the EVM. The price of gas can vary, often because the price of Ether varies, and is specified within the smart contract/dApp.

Every operation that can be performed by a transaction or contract on the Ethereum platform costs a certain number of gas, with operations that require more computational resources costing more gas than operations that require few computational resources. For example, at the time of writing, a multiplication instruction requires 5 gas, whereas an addition instruction requires 3 gas. Conversely, more complex instructions, such as a Keccak256 cryptographic hash requires 30 initial gas and 6 additional gas for every 256 bits of data hashed.

The purpose of gas is pay for the processing power of the network on execution of smart contracts at a reasonably steady rate. That there is a cost at all ensures that the work/processing being performed is useful and valuable to someone. Thus, the Ethereum strategy differs from a Bitcoin transaction fee, which is only dependent on the size in kilobytes of a transaction. As a result that Ethereum's gas costs are rooted in computations, even a short segment of code can result in a significant amount of processing performed. The use of gas further enforces incentivizes coders to generate efficient smart contracts/algorithms. Otherwise, the cost of execution may spiral out of control. Unrestricted, an exponential function may bankrupt a given user.

While operations in the EVM have a gas cost, gas has a "gas price" measured in ether. Transactions specify a given gas price in ether for each unit of gas. The fixing of price by transaction enables the market to decide the relationship between the price of ether and the cost of computing operations (as measured in gas). The total fee paid by a transaction is the gas used multiplied by gas price.

If a given transaction offers very little in terms of a gas price, that transaction will have low priority on the network. In some cases, the network miners may place a threshold on the gas price each is willing to execute/process for. If a given transaction is below that threshold for all miners, the process will never execute. Where a transaction does not include enough ether attached (e.g., because the transaction results in so much computational work that the gas costs exceed the attached ether) the used gas is still provided to the miners. When the gas runs out, the miner will stop processing the transaction, revert changes made, and append to the blockchain with a "failed transaction." Failed transactions may occur because the miners do not directly evaluate smart contracts for efficiency. Miners will merely execute code with an appropriate gas price attached. Whether the code executes to completion or stalls out due to excessive computational complexity is of no matter to the miner.

Where a high gas price is attached to a transaction, the transaction will be given priority. Miners will process transactions in order of economic value. Priority on the Ethereum blockchain works similarly as with the Bitcoin blockchain. Where a user attaches more ether to a given transaction than necessary, the excess amount is refunded back to that user after the transaction is executed/processed. Miners only charge for the work that is performed. A useful analogy regarding gas costs and price is that the gas price is similar to an hourly wage for the miner, whereas the gas cost is like a timesheet of work performed.

A type of smart contract that exists on the Ethereum blockchain are ERC-20 tokens (Ethereum Request for Comment-20). ERC-20 is a technical specification for fungible utility tokens. ERC-20 defines a common list of rules for Ethereum tokens to follow within the larger Ethereum ecosystem, allowing developers to accurately predict interaction between tokens. These rules include how the tokens are transferred between addresses and how data within each token is accessed. ERC-20 provides a framework for a means to build a token on top of a base cryptocurrency. In some embodiments herein, enhancements are built on top of the ERC-20 framework, though use of the ERC-20 technical specification is not inherently necessary and is applicable to circumstances where Ethereum is used as the base cryptocurrency.

Another type of smart contract that exists on the Ethereum blockchain are ERC-721 tokens (Ethereum Request for Comment-721). ERC-721 is a technical specification for NFTs. The ERC-721 introduces a standard for NFT. An ERC-721 token is unique and can have different exclusivity to another token from the same smart contract, maybe due to age, rarity or visuals.

NFTs have a unit 256 variable called tokenId. Thus, for any ERC-721 contract, the pair contract address, unit 256 tokenId must be globally unique. That said, a given dApp can have a "converter" that uses the tokenId as input and outputs an image.

Disclosure on token protocols has focused on Ethereum. As applicable in this disclosure, Ethereum is a base cryptocurrency. Other base cryptocurrencies exist now and in the future. This disclosure is not limited to application on specifically the Bitcoin or Ethereum blockchains.

CryptoKitties is an early example of an NFT platform. Users would engage in breeding and trading of cryptographic tokens that were visually represented by cartoon cats. Each cat had a family tree that was tracked by a blockchain and went back to the originator cats that digitally sired the subsequent cats. The visual representation of each cat had an appearance dictated by a number of preset options and was at least partly controlled by the visual appearance of the parent cat tokens.

Users would mate and auction cats as a game mechanic. When two cats mated, a third cat would be generated by the CryptoKitties dApp. The third cat was visually represented by some amalgamation of the features of the parents with the potential of a mutation (to potentially gain a particularly rare feature neither of the parents exhibited). Ultimately, generation of a cryptokitty is based on the user input of existing kitties, and kitties are the only acceptable datatype. That is to say, no other types of NFT are applicable. One cannot mate a cryptokitty with an emoji ID.

CryptoKitties had a number of viral features that were indicative of exclusivity. These features included particularly rare combinations of visual features and a lineage that was relatively close to an originator cat. In both cases, there was no algorithmic benefit for either of these exclusivity features.

While CryptoKitties does not implement any algorithmic connection to exclusivity features, some embodiments of the present invention do. It is frequently the case that exclusivity features of NFTs are connected to originator or early generation tokens. Additionally, tokens having rare visual features are considered exclusive. What generation a given NFT is, is identifiable using either metadata on the token itself combined with thresholds or heuristics regarding generational definitions or is identifiable by tracing back the token's generation through the respective blockchain of that token. Rarity of visual features is identified via a survey of existing tokens and the existing visual features thereof. Thus, in embodiments of the instant invention an evaluation is performed on each relevant token used as input that identifies the exclusivity features of that token, then those features are captured for use in generation of a new unique procedurally generated digital object (e.g., an NFT).

Emoji Sequence Based ID

Figure 3:
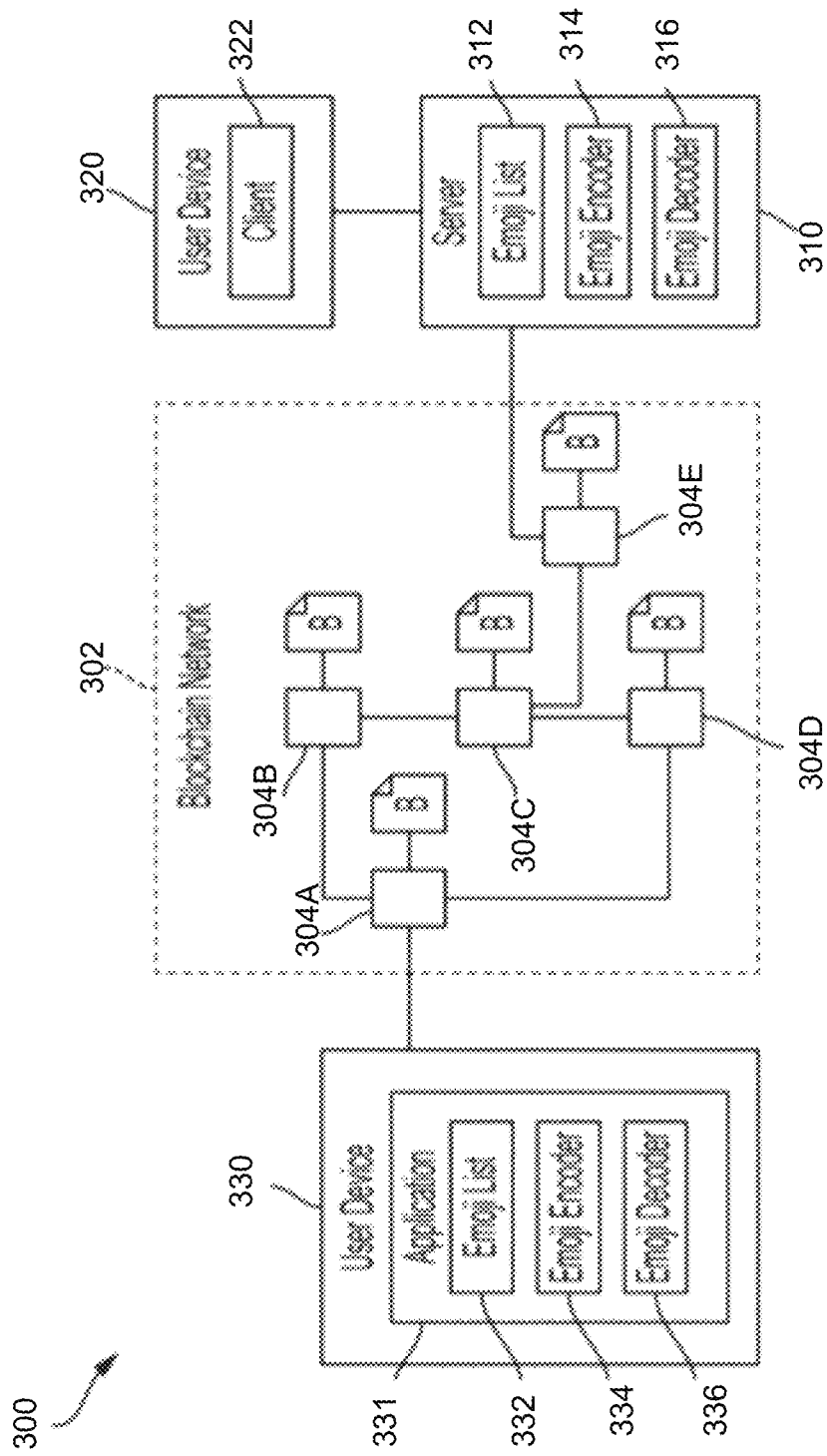
FIG. 3 illustrates a block diagram of a system for using emoji sequence IDs for identifying wallet addresses of blockchain wallets.

FIG. 3 illustrates a block diagram of a system 300 for using emoji sequence IDs for identifying wallet addresses of blockchain wallets. System 300 includes a blockchain network 302, user device 320, user device 330, and server 310.

As shown in FIG. 3, blockchain network 302 includes a plurality of nodes 304A-E (e.g., servers) that each maintain respective copies of a blockchain. In actual practice, blockchain network 302 may include hundreds or thousands of nodes. In some embodiments, blockchain network 302 may be a distributed peer-to-peer network as is known by those skilled in the art. In some embodiments, blockchain network 302 of nodes 304A-E implement known consensus algorithms to validate transactions submitted to blockchain network 302. A verified transaction may include transferred cryptocurrency, contracts, records, or other information to be recorded to the blockchain. In some embodiments, multiple transactions are combined together into a block of data that is verified across blockchain network 302. Once verified, this block of data can be added to an existing blockchain maintained by each of nodes 304A-E.

In some embodiments, a user can initiate transactions to be submitted to blockchain network 302 using user device 330. For example, the user may submit a transaction using application 331 configured to interact with blockchain network 302. For example, application 331 may generate and transmit cryptocurrency transactions to node 304A for validation and verification. Application 331 may include software downloaded from a digital distribution platform (e.g., App Store on Apple devices or Microsoft Store on Windows devices) or a content server. In some embodiments, application 331 provides a graphical user interface (GUI) that enables the user to generate transactions between his or her blockchain wallet and a blockchain wallet of a target recipient of cryptocurrency funds. Conventionally, the target recipient's blockchain wallet is identified by a wallet address in a human-legible textual representation. For example, the wallet address may be a string of numbers and/or characters such as in a hex format, a Base64 format, or a Base58 format. As described above, requiring the user to enter long strings of numbers and/or characters into application 331 to identify the wallet address of the target recipient is inefficient and prone to error.

In some embodiments, to enable the user to use an emoji sequence ID to uniquely identify a target wallet address for a blockchain wallet in cryptocurrency transactions, application 331 can implement an emoji list 332, an emoji encoder 334, and an emoji decoder 336.

In some embodiments, emoji list 332 can be stored in memory of application 331 and include a predetermined list of emojis that are used to enable use of emoji sequence IDs to identify wallet addresses of blockchain wallets. In some embodiments, the predetermined list includes a subset of emojis selected from the emojis in the Unicode Standard. For example, a give emoji list 332 includes 1626 emojis selected from the Unicode Standard. In some embodiments, 1626 emojis are selected because three emojis selected from 1626 emojis can uniquely map to a four-byte value. For example, an emoji ID of three emojis selected from 1626 emojis may include $1626^3$ unique emoji IDs, which is less than 0.1% more unique values than the total possible number of unique values (i.e., $2^{32}$) that can be represented by the four-byte (i.e., 32-bit) value. As will be understood by those skilled in the art, other numbers of emojis may be selected to be part of emoji list 332 to represent different number of bits. For example, an emoji list 332 having 46 emojis can represent an 11-bit value using two emojis (i.e., two emojis result in 46*46=2116 unique emoji IDs, which provides slightly more unique values than the possible values, 2048, of an 11-bit value).

In some embodiments, emojis in emoji list 332 may be selected to be visually dissimilar to reduce the likelihood that the user enters an incorrect emoji when entering the emoji sequence ID identifying the wallet address of the blockchain wallet. For example, the emojis may be selected such that no two emojis depict the slight variations of the same object. For example, a single emoji for a cat may be selected and included in emoji list 332 and not the multiple emojis depicting cats with different expression (e.g., grinning cat, cat with tears of joy, and pouting cat, etc.).

In some embodiments, to permit conversion between emoji IDs and integer values, emoji list 332 includes a plurality of emojis associated with a plurality of corresponding values. In some embodiments, emoji list 332 can be stored as an array, in which each emoji in the array has a corresponding index based on its position in the array. Therefore, each value associated with an emoji may be an index assigned to the emoji. In other embodiments, emoji list 332 may include a table that stores a plurality of emojis and that stores a plurality of values corresponding to the plurality of emojis. In these embodiments, emojis in emoji list 332 that are pictorially similar may be associated with the same value. In some embodiments, a set of emojis that is pictorially similar can include a plurality of emojis that depict types of the same object. For example, emoji list 332 may include multiple flag emojis that are each assigned an associated value of, for example, 9.

In some embodiments, application 331 can include an emoji mapping list that maps a larger number of emojis to the emojis in emoji list 332. For example, the emoji mapping list may include all available emojis in the Unicode Standard (i.e., 3,341 emojis as of January 2022). In some embodiments, by selecting mapping emojis to emojis in emoji list 332, two or more emojis that are pictorially similar may be mapped to the same emoji. For example, two or more emojis that show a clock depicting different types may be mapped to the same emoji of a clock. The use of an emoji mapping list may normalize the possible emojis to a list of emojis that are selected to be visually distinct to reduce error during user entry as well as to enhance the ease of visually verifying entered emoji sequence IDs.

In some embodiments, emoji encoder 334 can be configured to generate an emoji sequence ID that uniquely identifies a wallet address, which includes a predetermined number of bits (e.g., a 128-bit address or a 256-bit address). In other words, emoji encoder 334 can encode the wallet address into a sequence of emojis such that every wallet address is uniquely represented by exactly one sequence of emojis. Further, a valid emoji sequence ID represents exactly one wallet address. The encoding and decoding functions performed by emoji encoder 334 and emoji decoder 336, respectively, are symmetric functions. This means that encoding a wallet address, a, to its emoji sequence ID, s, and then applying the decoding function to emoji sequence ID, s, will always result in the originally encoded wallet address, a.

In some embodiments, to generate the emoji sequence ID, emoji encoder 334 can map a predetermined number of bits of the wallet address to a predetermined number of emojis selected from emoji list 332. In some embodiments, the predetermined number of bits of the wallet address can be divided into a plurality of non-overlapping groups of sequential bits. For example, the wallet address may be divided into 4-byte chunks. Then, emoji encoder 334 can convert each group of sequential bits into an emoji ID including a predetermined number of emojis based on emoji list 332. Finally, emoji encoder 334 can generate the emoji sequence ID identifying the wallet address by concatenating each emoji ID for each group of sequential bits into an emoji sequence.

In some embodiments, emoji encoder 334 can implement a mapping algorithm to convert the wallet address into the emoji sequence ID. For example, the mapping algorithm may include a BIP39 algorithm, an Electrum scheme algorithm, or a simple mapping from emoji index to a 10-bit value for emoji list 332 having at least 1024 emojis. In some embodiments, emoji encoder 334 can implement a mapping algorithm that uses indices of emojis in emoji list 332 to convert a numeric value to a predetermined number of emojis.

In some embodiments, to generate the emoji sequence ID, emoji encoder 334 may calculate a checksum value for the emoji sequence. For example, emoji encoder 334 may apply a checksum algorithm such as the Damm algorithm to calculate the checksum value. Then, emoji encoder 334 may convert the checksum value into an emoji representation including a predetermined number of emojis. Finally, emoji encoder 334 may output the emoji sequence ID identifying the wallet address by appending the emoji representation for the checksum to the emoji sequence previously calculated.

In some embodiments, emoji decoder 336 can be configured to generate a wallet address, which includes a predetermined number of bits (e.g., a 128-bit address or a 256-bit address), that is uniquely identified by an emoji sequence ID. In other words, emoji decoder 336 can decode the emoji sequence ID identifying the wallet address into a sequence of textual representations that uniquely corresponds to the wallet address. In some embodiments, the textual representation can correspond to an alphanumeric format for the wallet address that is required by blockchain network 302 to process cryptocurrency transactions. For example, the sequence of textual representations may be a hexadecimal string, a Base64 string, or a Base58 string.

In some embodiments, to generate the sequence of textual representations that identifies the wallet address, emoji decoder 336 can map the sequence of emojis in the emoji sequence ID to a numerical value identifying the wallet address based on emoji list 332. In some embodiments, emoji decoder 336 can determine the numerical value using emoji list 332 to identify a plurality of values corresponding to the plurality of emojis in the emoji sequence ID. For example, for an emoji in the emoji sequence ID, emoji decoder 336 may use an index of the emoji identified in emoji list 332 as a value associated with the emoji to be used in generating the numerical value. In some embodiments, emoji decoder 336 can convert a generated numerical value into the sequence of textual representations that uniquely identifies the wallet address.

In some embodiments, emoji decoder 336 can apply a checksum algorithm on the emoji sequence ID to determine whether the emoji sequence ID is valid. For example, emoji decoder 336 may apply the checksum algorithm to check whether the last emoji in the emoji sequence ID matches a result of the checksum algorithm applied to the emoji sequence ID excluding the last emoji. As described above with respect to emoji encoder 334, the last emoji may be generated to represent a checksum value of the emoji sequence ID. In some embodiments, if the checksum fails, emoji decoder 336 can halt processing because emoji sequence ID is invalid. In some embodiments, emoji decoder 336 can generate a notification indicating that the sequence ID is invalid.

In some embodiments, one or more emoji checksum can be extracted from the emoji sequence ID to generate a resultant emoji sequence. In some embodiments, the resultant emoji sequence can be divided into a plurality of non-overlapping groups of sequential emojis. For example, for an emoji list 332 having 1626 emojis, the result emoji sequence may be divided into groups of 3 emojis, with each group representing a 4-byte value. Then, emoji decoder 336 can convert each group of sequential emojis into a textual representation including a predetermined number of bits based on emoji list 332. Finally, emoji decoder 336 can generate the sequence of textual representations identifying the wallet address by concatenating each textual representation for each group of sequential emojis.

In some embodiments, functionality of application 331 may be performed elsewhere in system 300 such as on one or more of nodes 304A-E in blockchain network 302. In these embodiments, blockchain network 302 can be configured to be capable of processing transactions in which wallet addresses are identified using emoji sequence IDs. In some embodiment, an emoji sequence ID is a sequence of a plurality of emojis.

In some embodiments, functionality of application 331 may be performed elsewhere in system 300 such as on server 310. For example, server 310 includes emoji list 312, emoji encoder 314, and emoji decoder 316, which provides similar functionality as emoji list 332, emoji encoder 334, and emoji decoder 336, respectively. In some embodiments, server 310 may be a web server that enables users to operate a client 322 on user device 320 to access the functions of server 310. For example, client 322 may be a browser that enables the user to connect to a web portal or interface provided by server 310. Therefore, a user using user device 320 may initiate transactions to be verified by and added to blockchain network 302 via server 310.

Unique Digital Object Generation

Figure 4:
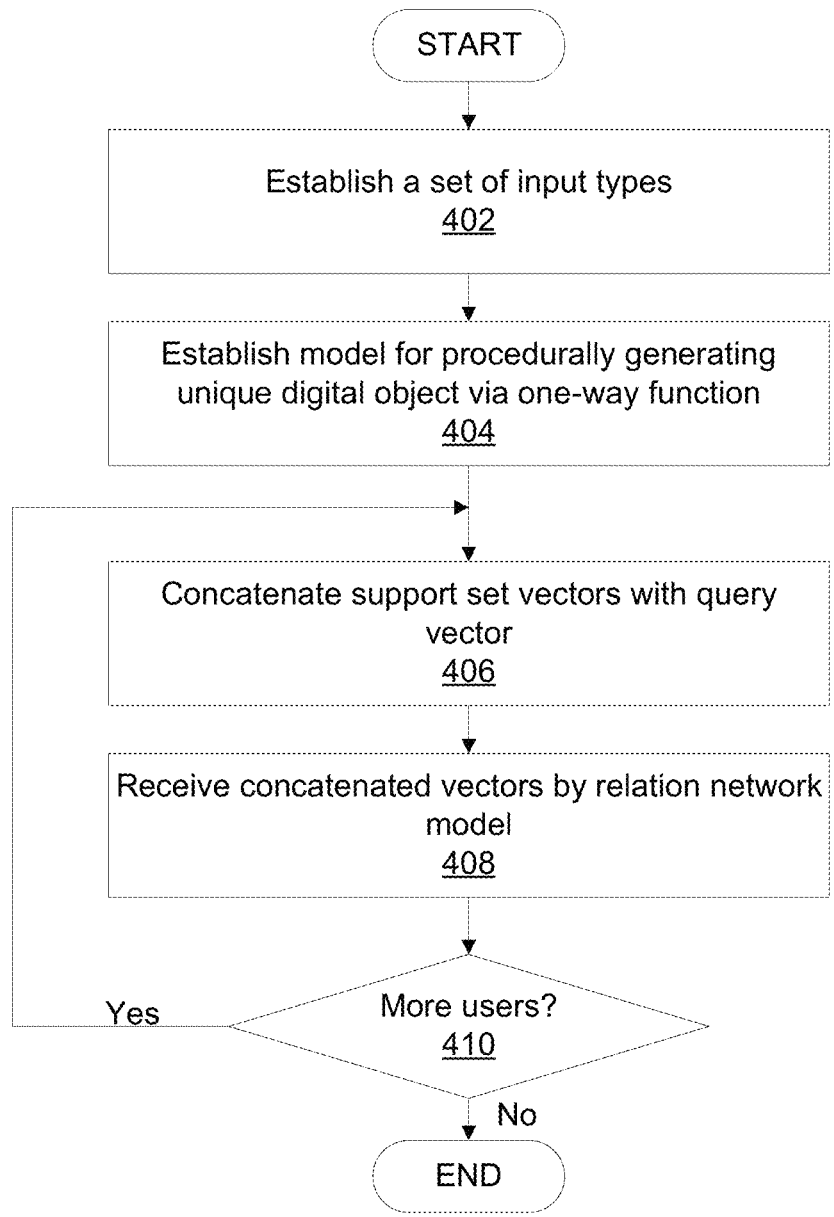
FIG. 4 is a flowchart illustrating platform generation of a unique procedurally generated object via user specific parameters.

FIG. 4 is a flowchart illustrating platform generation of a unique procedurally generated object via user specific parameters. In step 402, the digital object generator establishes a set of input types and parameters handled. Examples of the types of input include handled by various embodiments include any combination of cryptographic protocols, image data, or multimedia data.

Input handling refers to the types of input a given platform understands or recognizes. When designing input handling, the platform first recognizes what sort of input is given to it, and then when to do with the parameters of the input.

With reference to recognition of cryptographic protocols, a given input may be a cryptographic wallet, and the tokens associated therewith. In some cases, a given cryptographic wallet is associated with tokens from multiple cryptographic object types that each have their own smart contract, or blockchain upon which those objects are tracked. A common blockchain used for NFTs at the time of this application is the Ethereum blockchain. However, it is contemplated, that NFTs may operate on different blockchains in the future. A given token within a wallet typically has a call or an identifying feature that indicates which dApp the token is associated with.

With reference to image data, a given input may be a .jpeg or some other digital image format. In such examples, the file extension identifies what the input is, and the parameters thereof are identified via computer vision techniques. Similar input identification is applied to multimedia input.

Other data types may include user accounts, or game save files. Game save files often include data regarding characters the user has played, a total play time, items held by the user's character, choices the character has made, or other game related aspects. An example of a user account is a social media account, where data included relates to number of posts made, posts that had the highest amount of interaction (in any combination of negative/positive), number of followers, and other social media related aspects. Some embodiments of the present invention make use of these data types and parameters.

In step 404, the digital object generator establishes a model that procedurally converts the received user parameters and input into a digital object via a one-way function. The model used varies based on the style of input used. The process is ultimately transformative on the input and while, in some embodiments, the output may be indicative or reminiscent of the original input, computationally deriving the exact inputs from the output is not seen as a viable problem using modern computing techniques.

The simplest embodiment is a hash function the converts data embodied in a given format (e.g., binary, alphanumeric, ASCII, array of values, etc.) into a hash value. More complex embodiments make use of multiple models or schemes to convert multiple data types into a common data type/data structures and subsequently apply a model that generates an amalgamated output. For example, with respect to ERC-721 tokens, a model identifies exclusivity features of that ERC-721 token. The exclusivity features are identified via examination of the relevant smart contract using an associated dApp plugin/API with the ERC-721 token. The exclusivity features for that given token may differ based on the relevant smart contract the token is associated with, though some exclusivity features are relatively universal.

Examples of identifying exclusivity features include ID number (numeric count) or identifying the generation of the token as compared to the total number of generations of token. Generations in this context refer to how close the token is to originally minted tokens of the same smart contract. Generations are cycles or series of minting of tokens in a given smart contract. Typically, earlier generation tokens are considered more exclusive. Further traceable features include a number of times a given token has changed hands, a value of each exchange of that token in cryptocurrency or fiat, and rarity of visual features included with the token.

Rarity of visual features on a token varies on a smart contract by smart contract basis. In some cases, there is an algorithmic rarity of features dictated in the smart contract. In such cases, the rarity of visual features is a static lookup. In some cases, the rarity of a given visual feature or combination of visual features is determined via a survey of existing NFTs associated with a given contract. With respect to a cryptokitty, a rare color is "cloud white" coloring. In each case, a model evaluates these features and weights each and generating a respective weight across a given set of input for the user.

A type of model that has advantages over reviewing potentially dissimilar data types is a few-shot model. Initially the few-shot model is trained using various data that users associate with themselves. Examples include are social networking profiles, art, videos, audio recordings, virtual environments, ERC-721 tokens and associated protocols and dApps, and publicly posted Internet discourse. Training data typically refers to an enormous number of examples, such as hundreds of thousands or millions of examples. After being trained, the user specific parameters act as a few-shot. Each of the user input items need not be of a similar type, and the model will attempt to fit the received input into categories the model has been trained with. Each of the input parameters potentially has very little in common with respect to data types.

The few-shot model is designed to identify and extract particular media features in the few-shot (the user's specific parameters). A follow up model then identifies which features to use and what to do with those features. For example, a graphic feature of one element of user specific input may include a hat, while yet another graphic feature of a different element of user specific input may include a head. The model is trained that hats go on heads and that the graphic feature of a hat from one element may be transposed onto the graphic feature of the other element including a head.

Based on configurations of the model the resulting digital object may vary. One example of a resulting digital object is an ERC-721 token that includes a visual component. In some embodiments, the visual component takes exclusivity elements from the user's input and integrates those components into a single visual representation. A given example is a single image of a mashup of initial input. Another example is a 3D virtual environment that includes a set of trophies resembling the initial input. A third example is a written poem that rhymes various elements of the initial input. The digital object need not be an NFT. Rather, a digital object refers to a set of data that describes a discrete output in a digital format.

In step 406, a given user submits their user specific parameters to the digital object generator. In step 408, the model executes utilizing the user specific parameters and generals a user specific, unique, digital object. In some embodiments, the generation of the object is embodied by the minting of an ERC-721 token. In step 410, where there are additional users, the process repeats from step 406.

Figure 5:
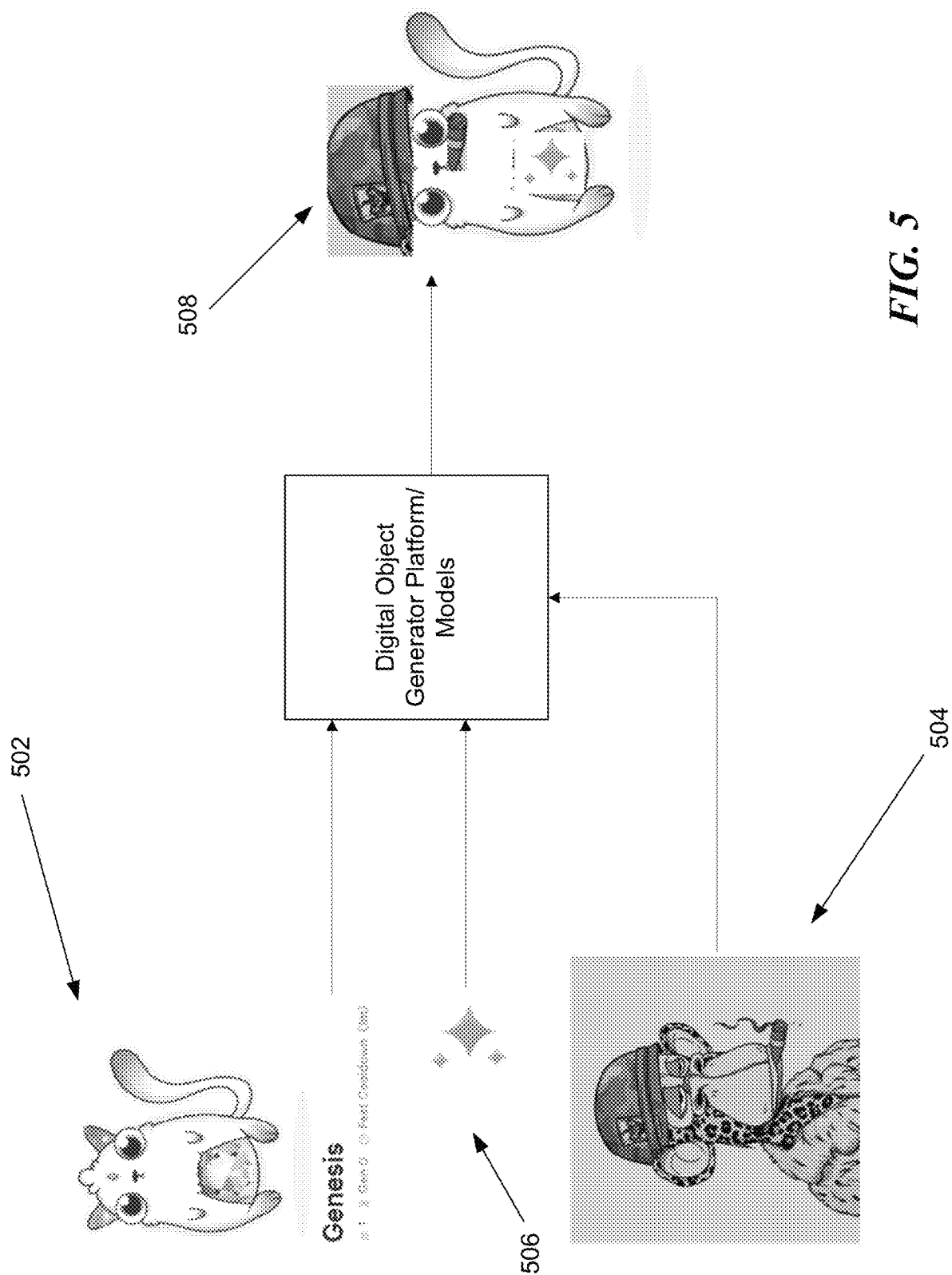
FIG. 5 is an illustration of a new digital object generated from a set of user input.

FIG. 5 is an illustration of a new digital object generated from a set of user input. The illustration includes three visual representations of existing NFTs, Specifically, a cryptokitty input 502, a Bored Ape input 504, and a Yat input 506 as provided as examples of initial user input. Each of the NFT's is further connection to a cryptographic record on a dApp, and the visual representation is interpreted by the respective dApp. A new digital object 508 is depicted that incorporates elements of the visual representation of each. In this illustrative example of the new digital object 508, the cryptokitty graphic of the cryptokitty input 502 appears with a hat and cigar graphic from the bored ape input 504, and the emoji of the Yat input 506 positioned on the belly of the cryptokitty graphic.

FSL embodiments applied to this particular set of input identifies each graphic feature of the user input. The cryptokitty input 502 is a cartoon cat, the cat has a head, a mouth, and a clearly delineated stomach area (among other body parts). The bored ape input 504 is a cartoon of an ape wearing a hat and smoking a cigar. The Yat input 506 is an emoji graphic.

Given the extracted features a model trained to select and combine the features that fit with one another matches a hat to a head a mouth to a cigar and an emoji graphic to an open space to position a graphic (e.g., well-defined stomach area).

The resulting digital object is the result of a one-way function. In the depicted example, one cannot, for instance, identify all of the details of the bored ape input 504, but may be able to identify that the original input included a bored ape based on the art style.

Figure 6:
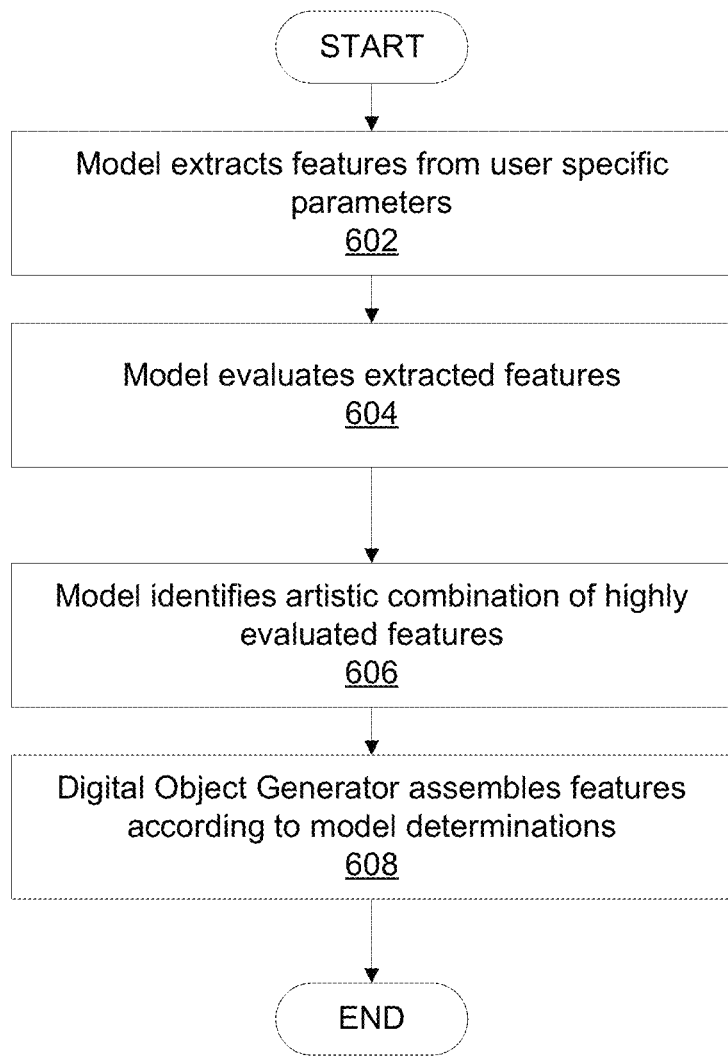
FIG. 6 is a flowchart illustrating model operation step of a unique procedurally generated object via user specific parameters.

FIG. 6 is a flowchart illustrating model operation step of a unique procedurally generated object via user specific parameters. In step 602, a set of user specific parameters are received by a feature extraction model. An embodiment of the feature extraction model is a few-shot model. The term "feature" refers to graphic features, audio features, cryptographic protocol features, video features, spatial virtual features, textual features, and/or social media features.

In step 604, extracted features are indicated to a feature evaluation model. The feature evaluation model identifies which of the extracted features to use in generation of the digital object. The model chooses features based on distinctiveness (e.g., how different they are from other available features), interoperability (e.g., how functionally a given feature can mix with another feature), and/or exclusivity (e.g., the rarity of a given feature).

In step 606, the chosen features are amalgamated by an artistic model. In some embodiments the artistic model and the feature evaluation model generate a result together. The artistic model is trained regarding what features go together. In some cases, "going together" is defined in the model semantically. That is to say, for example, that hats go on heads. That is a semantic connection between objects. However, some embodiments of the artistic model define "going together" as graphic matches between contours, colors, shadings, or other visual elements. For example, one curved element is a near match to another curved element, so one of those elements may overlay on another using curve matching. Similar to graphic matching, auditory matching may combine audio clips at a point where a similar note series occurs.

In step 608, once the elements are extracted, evaluated and combined, the digital object generator prints/mints the new digital object.

Time/Location-Based Modification of Digital Objects

User parameters have thus far been defined as something that solely a given user provides. However, in some embodiments, parameters used by the digital object generator are circumstantial to the minting request. Examples include a current generation/minting series of digital objects being generated, the serial numbers of the digital objects being minted, the timestamp the digital object is being minted at, or current events around the time of minting (e.g., The Superbowl, a concert, a convention, etc.). Location is identified as a device location of a user device requesting generation/minting of the digital object as associated with addresses, buildings, or events. Device location is determined via GPS data and/or wireless network triangulation. The location data is associated with the physical area by overlaying the location data on a mapping program that includes metadata of buildings and/or events at the physical area of the location data.

In some embodiments, the time/location-based modification is used as a salt or a randomization element to a given input set. In some embodiments, the time/location-based modification element is identifiable from the resulting digital object is (e.g., while the function is one-way, at least the time-based input feature is fully identifiable). Time/location-based input features enable an additional means of variation, distinction, and social features.

Figure 7:
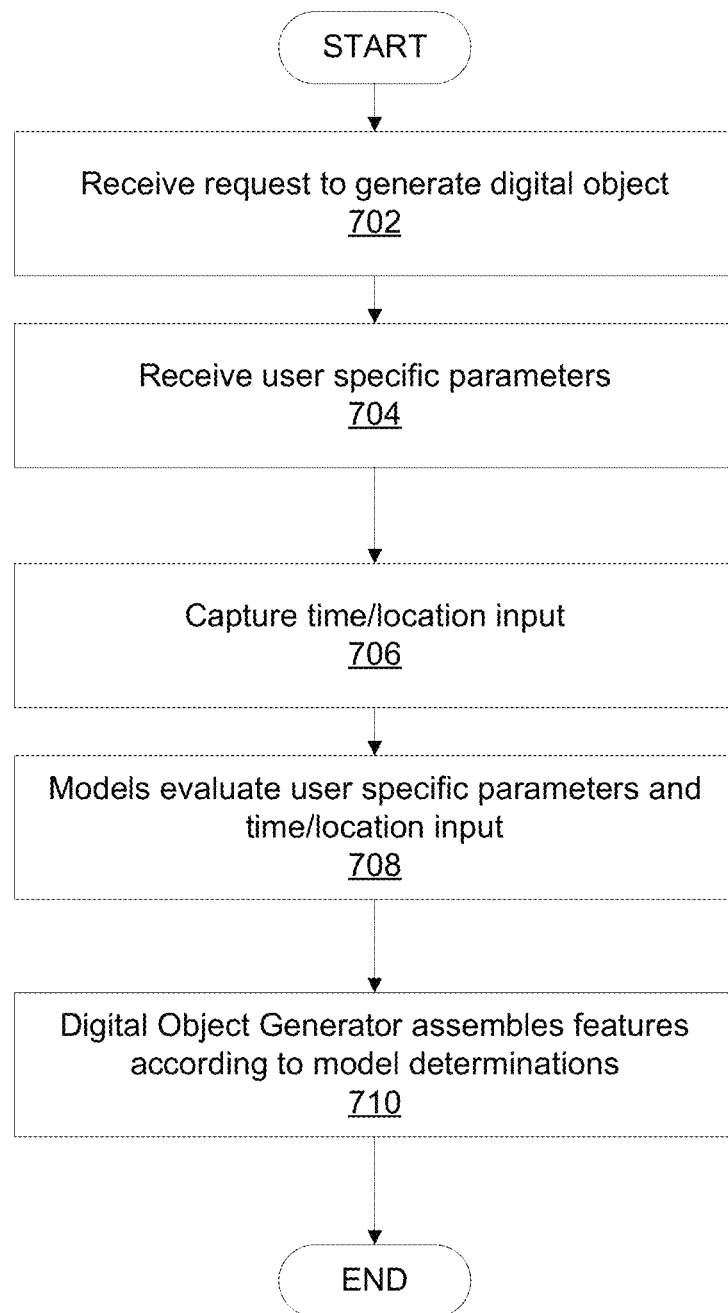
FIG. 7 is a flowchart illustrating implementation of time-based input to digital object generation.

FIG. 7 is a flowchart illustrating implementation of time-based input to digital object generation. In step 702, the digital object generator receives a request to mint a new digital object. In step 704, user specific parameters are received by the digital object generator. In step 706, one or more of a time element and/or a location element is captured based on any of the present time, the minting status of digital objects, and/or where the request of step 702 was made from.

In step 708, the models responsible for digital object generation evaluate the user specific parameters and the time/location element giving high weight to the time/location element. In step 710, the digital object generator mints a digital object including the time/location element.

Blockchain Tracing of Digital Objects

Like Emoji sequences as described above, embodiments of the digital objects are encodable to a distributed consensus network such as a blockchain. An example blockchain is the Ethereum blockchain, via ERC-721 tokens. Whereas emoji sequences have a finite number of potential characters, the digital objects described herein do not. A theoretical encoding scheme is unable to scale indefinitely to match the number of characters/elements/formats that embody a given digital object.

A means to limit the number of variables to represent in a given digital object is to limit the number of digital objects in any given series or generation (e.g., 1000 digital objects). Where a series or generation is encoded to a portion of a cryptographic token, encoding may be refreshed and reused in subsequent series. For example, a first data unit (e.g., a byte) is used to identify the generation of the digital object whereas subsequent data units are used to encode the visual features of the digital object. The same encoding is subsequently used in a different generation to refer to a different visual feature.

Figure 8:
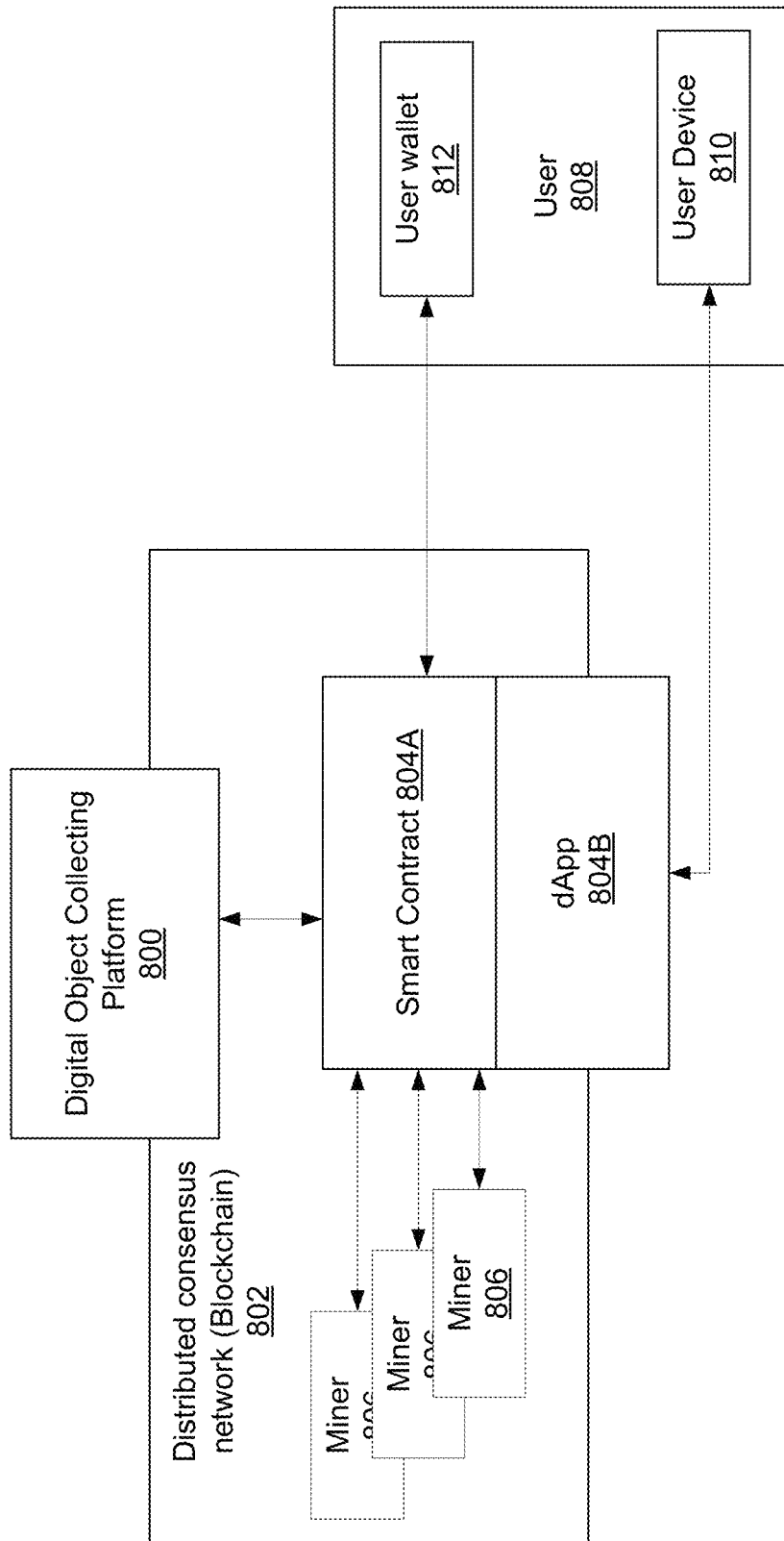
FIG. 8 is a diagram illustrating a connection between digital objects and a distributed consensus network supported by a blockchain data structure.

Generational divisions are also effectuated through event-based minting of digital objects. FIG. 8 is a diagram illustrating a connection between digital objects and a distributed consensus network supported by a blockchain data structure. A digital object creation platform 800 interfaces with a blockchain 802 via a dApp/smart contract 804A/B. The smart contract 804B is executed by miners 806.

When a user 808 requests minting of a new digital object via the dApp 804A, the dApp makes calls to other dApps connected with the user device 810 in order to identify other NFTs that the user has possession of via the other dApps. Embodiments of triggers to call other dApps include identifying other dApp software on the device 810 making the request to mint the new digital object, checking a list of popular dApps, and/or enabling the user to identify/flag (e.g., via GUI) which dApps they wish to flag for inspection for purposes of generating the new digital object.

In some embodiments, the dApp 804A ensures possession of the other NFTs used as input in the same user wallet 812 as the user wallet 812 associated with the initial request to generate the digital object. In this way, users are forced to actually own the NFTs that they are supplying as input for the generation of the digital object.

The check identifies the public key that is associated with both the requestor 808, and all of the user specific parameter/input. By nature of public keys being public information, no secret information need be shared with the dApp 804A.

Once minted, the dApp 804A delivers the new digital object as a cryptographic token/NFT to the cryptographic wallet 812 associated with the requesting user 808 via the smart contract 804A.

Figure 9:
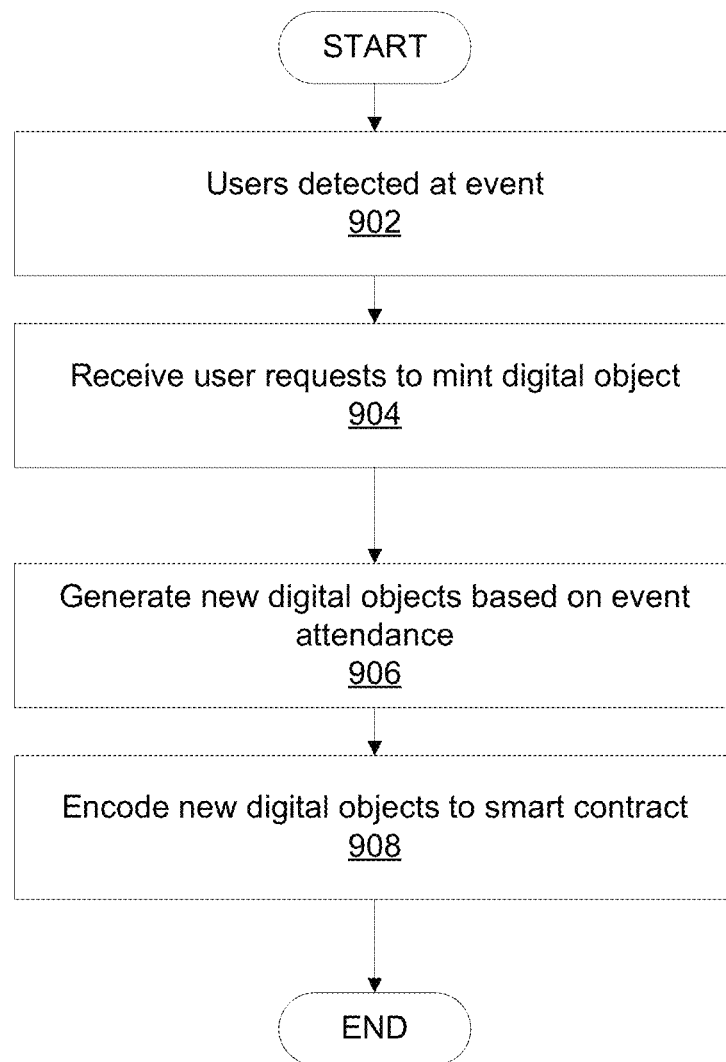
FIG. 9 is a flowchart illustrating event driven generation of digital objects.

FIG. 9 is a flowchart illustrating event driven generation of digital objects. Event driven digital objects aid in limiting the number of digital objects in a series or generation such that only digital objects that were generated during or at a given event exist, thereby limiting the total number. Limiting the total number serves both exclusivity of the digital objects and simplicity of coding the objects. Fewer digital objects mean fewer total variations across the entire set of digital objects and thus less data is required to represent the visual assets associated therewith.

In step 902, a set of users attend an event. Verification of attendance occurs in one or more of user device location data, ticket data, guest list data, user activity on a predetermined web host, and/or ownership of an NFT connected to event admittance (e.g., convention, gala, sporting event, etc. . . . ). In step 904, during the event an attending user requests to mint a new digital object. In step 906, the digital object generation platform generates a digital object based on the event. In step 908, the non-cryptographic, user decipherable representation of the digital object is encoded to the smart contract using assets that are linked to the event.

Digital Object Social Networking Communities

Embodiments of social networks connect users based on possession of digital objects. A social network is a computing construct that connects users in a graph data structure including social features.

Figure 10:
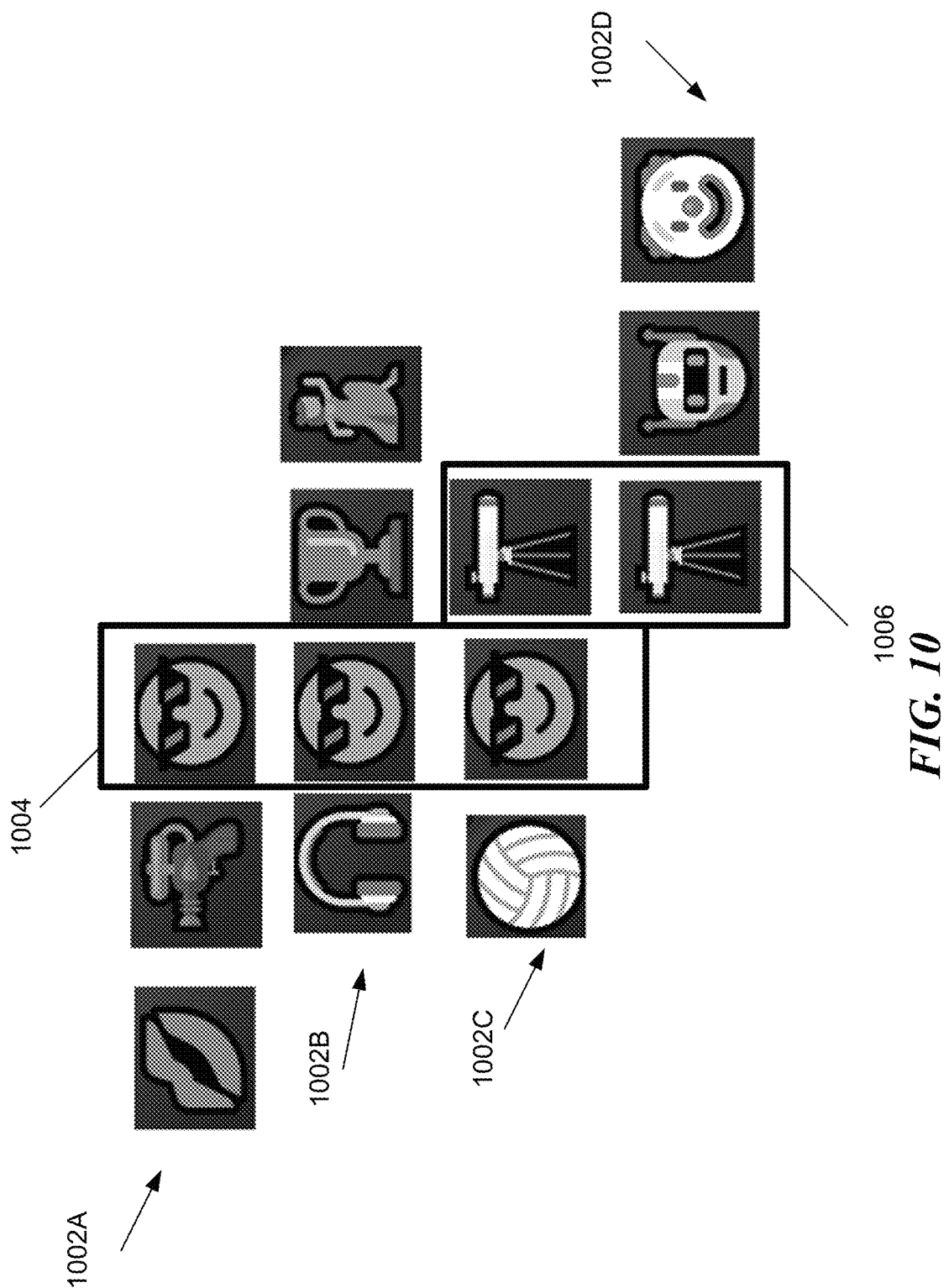
FIG. 10 illustrates a number of emoji sequences that are connected via social networking features based on the features included in each emoji sequence.

FIG. 10 illustrates a number of emoji sequences that are connected via social networking features based on the features included in each emoji sequence. Emoji sequences such as those under marketed as Yats include order specific sequences of emojis that are selected by their respective users. Users select particular sequences of emoji for any number of reasons, though some do so out of an affinity to a given emoji or series of emojis. Some users further use the sequence of emojis to tell a narrative.

Emoji sequences 1002A-D are arranged to align commonality between each sequence vertically. A sample social network for a user having possession of the emoji sequence 1002C is portrayed. Specially, the user in possession of sequence 1002C is connected 1004 to users in possession of 1002A and 1002B by virtue of sharing a sunglasses smiley emoji in each respective emoji sequence. In some embodiments (not pictured), social connections are limited to those emoji sequences that position matching emojis in matching sequence locations.

Emoji sequence 1002C and 1002D are further socially connected 1006 based on similar inclusion of the telescope emoji. In some embodiments a degrees of connection analysis (e.g., "6 degrees") is performed to further connect users associated with emoji sequences. For example, the user associated with emoji sequence 1002A is connected via one degree away from emoji sequence 1002D, via the social connection to 1002C. In some embodiments social features between connected users enable shared newsfeeds, message delivery, and/or interactive games.

While the example depicted in the figure pertains to social connections via emoji sequences, similar social connections are established between digital object owners. For example, digital object owners that have respective digital objects that similarly made use of a give type of ERC-721 token are linked in the same way users with matching emoji use are linked (e.g., users that have a Yat, or users that have a cryptokitty, etc.).

Social media users frequently craft an image or identity around their profiles. However, existing social media profiles are static based on a given set of settings or preferences. That is, changes to a social media profile are preconfigured or require active participation by the user to make changes to their profile. Embodiments of the unique digital object disclosed herein are implemented as "profile pictures" or otherwise customizable social media expressiveness. IN some embodiments, a novel profile picture cycles through a set of user submitted input. An example of such a profile picture cycles through visual representations of cryptographic tokens linked to a cryptographic wallet they control.

Some embodiments of the profile picture unique digital objects make use of 3D shapes such as polygons or spheres.

Figure 11:
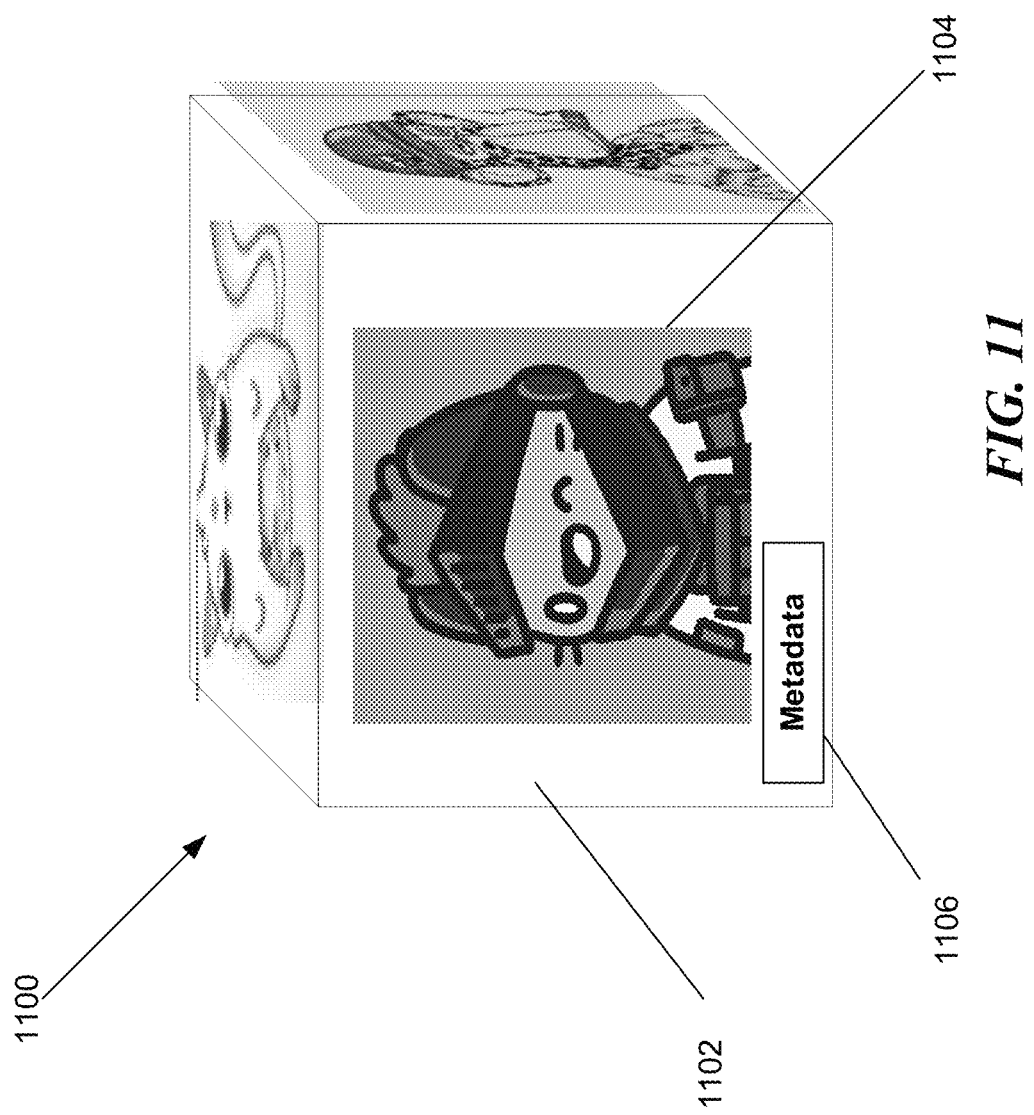
FIG. 11 is an illustration of a 3D graphic object.

FIG. 11 is an illustration of a 3D graphic object 1100. An embodiment of a 3D graphic object 1100 is a 3D polygon including six faces (e.g., a cube) that displays user supplied input/content. An implementation of a social media profile making use of the 3D graphic object 1100 presents the 3D polygon on the social media profile in place of a profile picture or other element of the social media profile. The cube revolves (e.g., following a random or preconfigured path through faces) and/or may be dragged into a given position by a user. The preprogrammed path follows a user selected order, or a preconfigured setting (e.g., display faces as chronologically added, display faces with fewer impressions first, etc. . . . ).

In some embodiments, user interaction with the 3D graphic object 1100 in predetermined ways is logged in the social networking platform. For example, spinning, clicking, dragging, or swatting the 3D graphic object 1100 is recorded as social interactions including options such as: "like", "dislike," "follow," "friend request," "post," etc . . .

The 3D polygon enables some liquidity to a user's self-selected persona/profile picture. Multiple images or avatars 1104 exist simultaneously for that user as each is represented on a face 1102 of the 3D polygon. The number of images/avatars 1104 are not limited by the number of faces on the polygon—rather, in some embodiments, faces rotate. For example, where the 3D graphic object 1100 is presented in a 2D plane, a face 1102 that is currently out of view or opposite a front face is modified to present a different image/avatar 1104.

The Figure depicts use of a polygon (cube) with sides or faces 1102; however, spherical embodiments make use of surface regions instead of strict faces 1102. Surface regions occupy some predetermined portion of the surface of the sphere and acts similarly as a face. In some embodiments, the sphere is depicted as a globe, and the regions are depicted as "landmasses/continents" found thereon.

In some embodiments, the images/avatars 1104 implemented by the 3D graphic object 1100 are representations of cryptographic tokens (visual or otherwise). In these embodiments, there is further data or metadata 1106 that is associated with the cryptographic token. Examples of the metadata 1106 associated with a cryptographic token includes a smart contract or dApp that the token is connected to, the period of time the given user has held the token with their cryptographic wallet, the number of times the token has changed wallets, a list of prior users who held the token, a generation of the token, a serial number of the token, and/or a name of the token. The metadata 1106 is displayed by the 3D graphic object 1100. Some embodiments display the metadata on a forward-facing face 1102 of the 3D graphic object 1100.

Some social networking platforms make use of the metadata 1106 (even if not actively displayed) for tracking, analytics, impression data, advertisement placement, and matching purposes.

The 3D graphic object 1100 inserts directly into social media profiles where profile pictures or avatars traditionally are placed. In some embodiments, the 3D graphic object is given a more prominent position on the user interface of the social network, specifically taking up a greater portion of the page/window. Still other embodiments make use of the 3D graphic object in an extended reality (XR) setting. For example, is a digital or digitally augmented environment, the 3D graphic object 1100 follows the user or an avatar of the user around (e.g., as a pet or companion).

Figure 12:
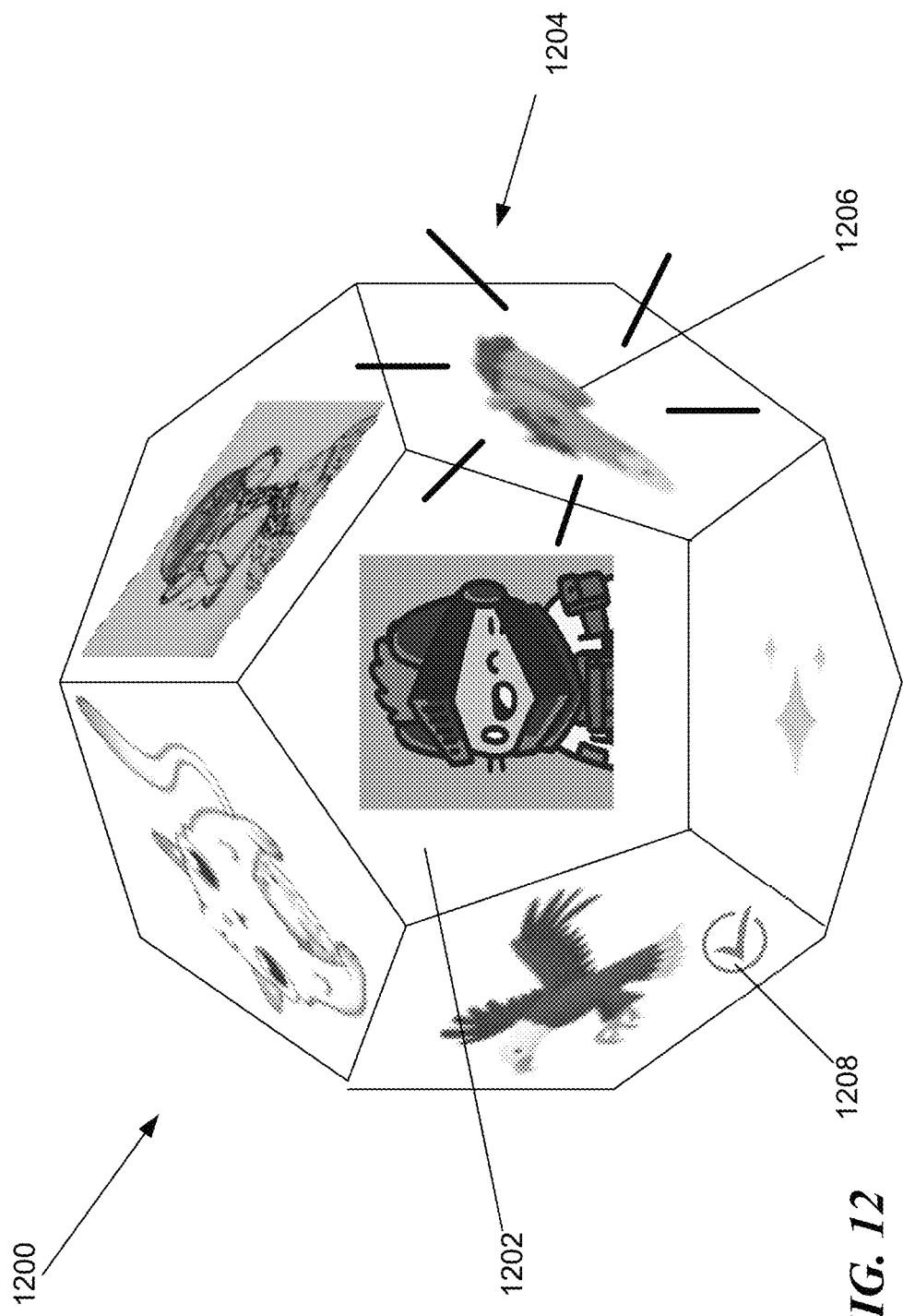
FIG. 12 is an illustration of a first set of additional features of a 3D graphic object.

FIG. 12 is an illustration of a first set of additional features of a 3D graphic object 1200. Where the polygon depicted in FIG. 11 is a cube, FIG. 12 depicts a dodecahedron. Various embodiments employ different numbers of faces 1202, fewer and greater. Various embodiments expand and contract faces 1202 based on user and/or platform settings.

In some embodiments, the 3D graphic object 1200 includes additional focus or highlighting 1204 on certain elements 1206 based on user and/or platform settings. For example, where a given element 1206 is newly included in the 3D graphic object 1200, a highlight glow 1204 is added to the appearance of the given element 1206 to alert users to the presence of the new element 1206. In another example, the highlight glow 1204 is applied to an element 1206 as chosen by the user.

In some embodiments, elements 1206 displayed by the 3D graphic object 1200 are verified 1208. Where a given element 1206 is a representation of a cryptographic token verification may be performed on the token to authenticate the token as being representative of an intended token. Token representations are digital data that can be copied and reproduced. Those representations may be subsequently linked to tokens that are not connected to a platform from which the representation originated. Therefore, a verification performed to ensure that the representation that appears on the 3D graphic object 1200 is linked to a cryptographic token that is connected to a smart contract or dApp consistent with the representation. For example, a cryptokitty graphic may be re-minted onto a cryptographic token that is unconnected to the cryptokitties dApp. Verification markings certify that the cryptokitty representation on the 3D graphic object 1200 is connected to a cryptographic token on the cryptokitties dApp/smart contract.

Verification is performed by human verification (e.g., a comparison of the token representation to the underlying token that the representation is drawn from), heuristic analysis (e.g., comparing known art styles of the representation to expected dApp's drawn from a popular list), or via a machine learning model that was trained on identification of token representations.

Figure 13:
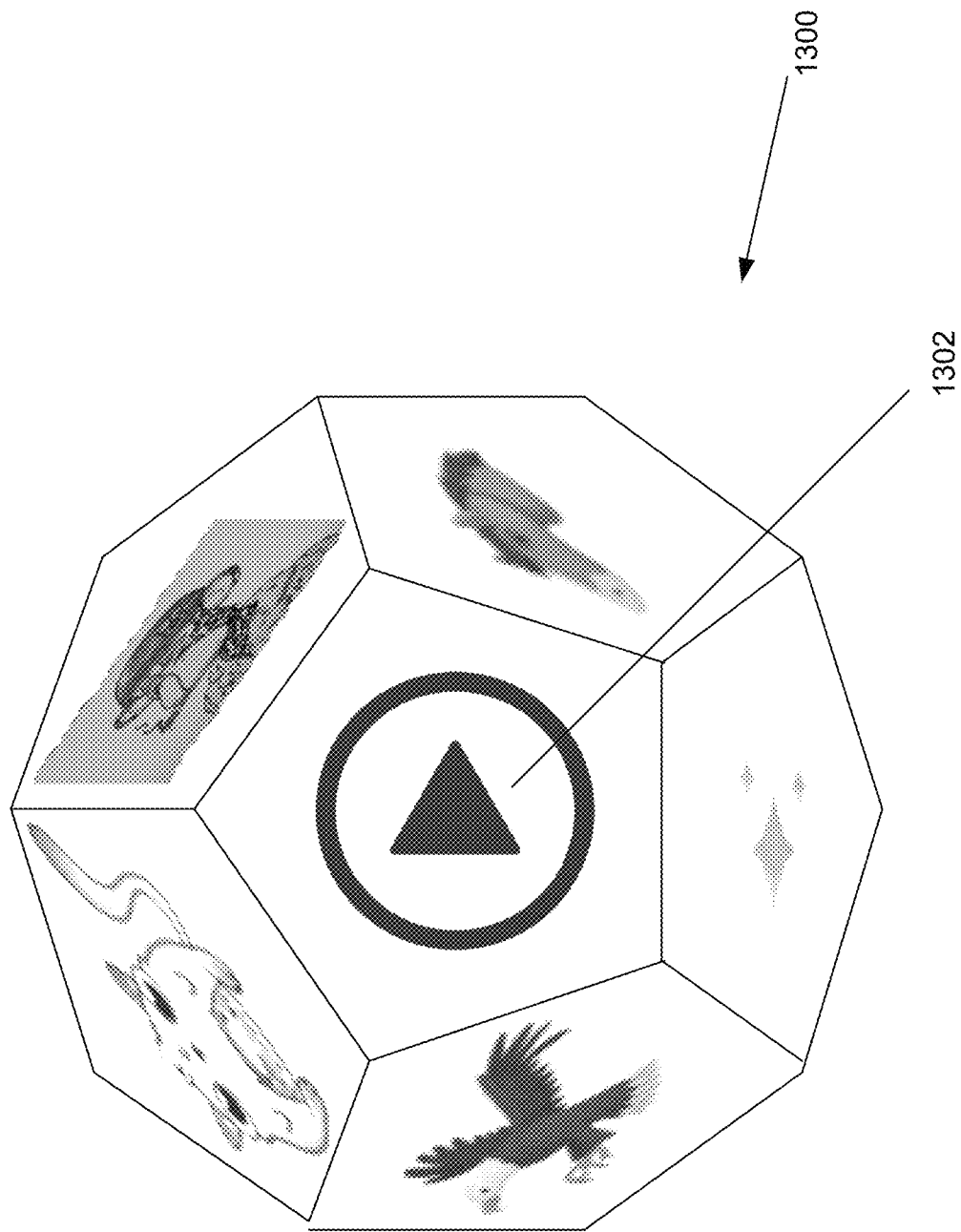
FIG. 13 is an illustration of a second set of additional features of a 3D graphic object.

FIG. 13 is an illustration of a second set of additional features of a 3D graphic object 1300. Not all elements 1302 included on a 3D graphic object 1300 need be images. Other examples include audio data, video data, or multimedia data. As depicted in the figure, a play button appears that users may interact with. Activating the play button triggers the underlying multimedia element 1302 to play.

Figure 14:
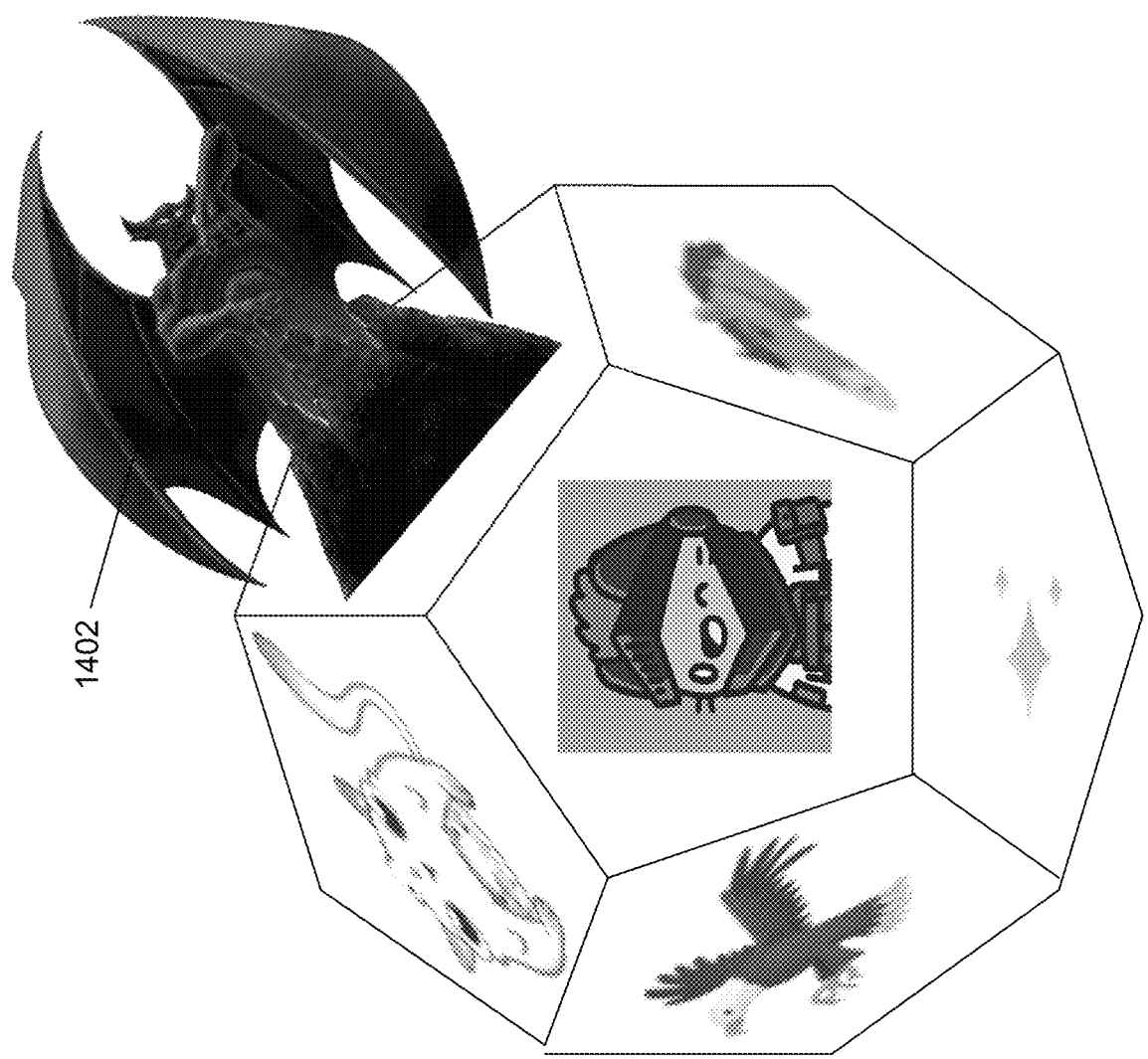
FIG. 14 is an illustration of a third set of additional features of a 3D graphic object.

FIG. 14 is an illustration of a third set of additional features of a 3D graphic object 1400. Not all elements 1402 included on a 3D graphic object 1400 need be represented in 2D. Examples include 3D renderings that extend out or inward from the 3D graphic object 1400. As depicted in the figure, an animated character appears bursting from the 3D graphic object 1400.

Figure 15:
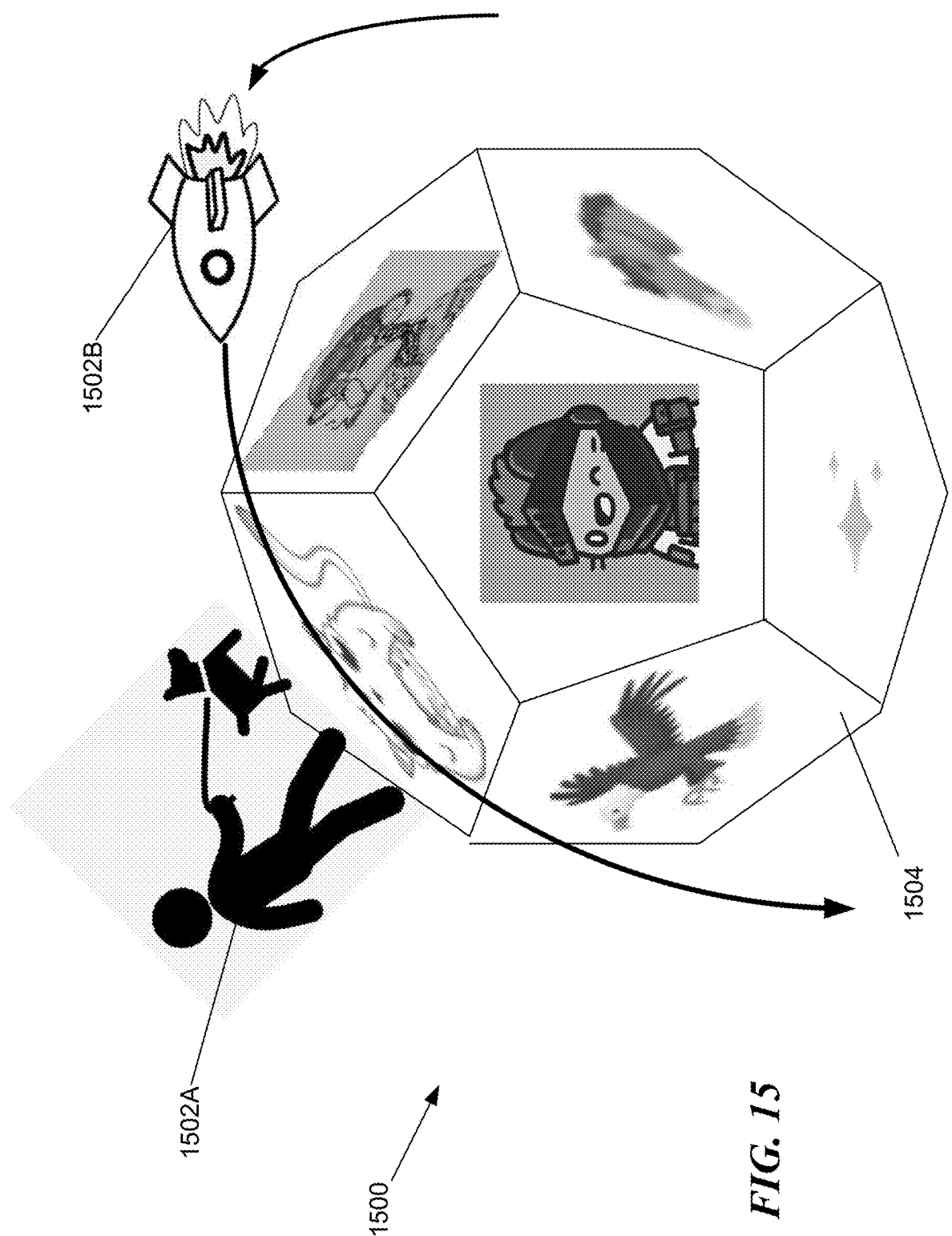
FIG. 15 is an illustration of a fourth set of additional features of a 3D graphic object.

FIG. 15 is an illustration of a fourth set of additional features of a 3D graphic object 1500. Not all elements 1502 associated with a 3D graphic object 1400 need be locked to the surface or face 1504 of the 3D graphic object 1500. Embodiments include orbiting elements 1502. The orbiting elements 1502 track around the 3D graphic object 1500. As depicted in the figure, an animated character 1502A appears to be walking a dog around the surface of the 3D graphic object 1500. Additionally, a spaceship element 1502B orbits the 3D graphic object 1500 at a distance. The orbiting elements 1502 as positioned in slots similarly to other elements included, the slots are merely associated with a different region relative to the 3D graphic object 1500 than those positioned on the faces 1504.

FIGS. 11 through 15 depict various features of various embodiments of 3D graphic objects. The figures are intended as illustrative examples and not to be construed as limiting combinations of features. The features are interchangeable, and embodiments include each combination thereof. Input used for the 3D graphic object may include any of the described user specified parameters described herein and/or pre-generated elements.

Figure 16:
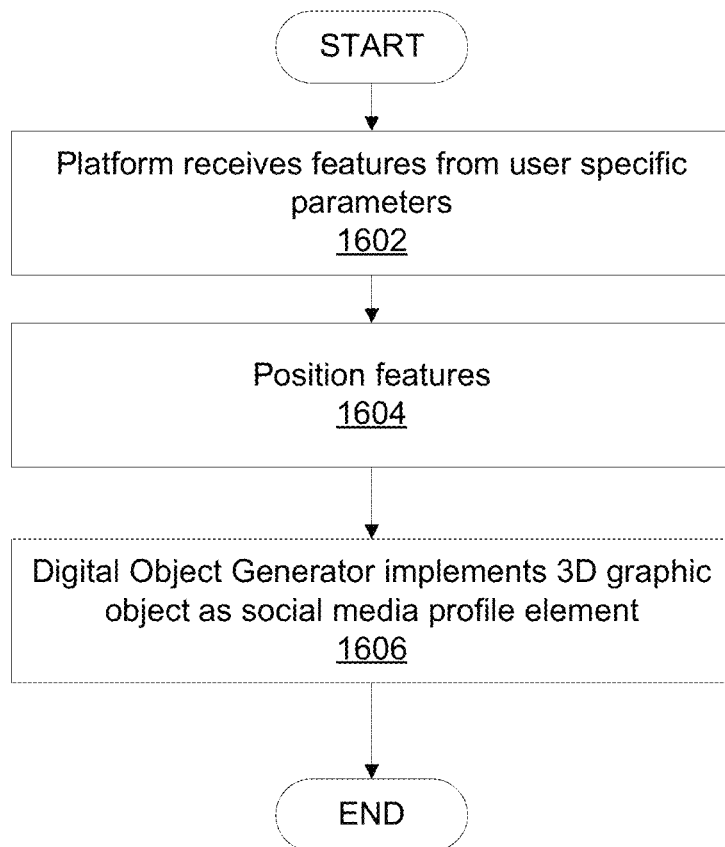
FIG. 16 is a flowchart illustrating a user interface applied to a 3D graphic object.

FIG. 16 is a flowchart illustrating a user interface applied to a 3D graphic object. In step 1602, a set of user specific parameters are received by an object generator. The user specific parameters are employed as elements in the 3D graphic object. User specific parameters refers to graphic representations, audio representations, cryptographic protocol representations, video representations, spatial virtual representations, textual representations, and/or social media representations.

In step 1604, the platform receives input regarding positioning and implementation of the user submitted parameters. The user is enabled to design the appearance of the 3D graphic object based on the user submitted parameters used as elements and the configuration of those elements.

In step 1606, the chosen features are amalgamated according to the configuration and the 3D graphic object is inserted into a social media profile of the user. In some embodiments the 3D graphic model is minted as an NFT. The minted version of the 3D graphic object may be implemented in any other portion of the disclosure herein where an NFT is referenced.

The above-described process directly refers to generation of the 3D graphic object, though other processes described herein may also generate 3d graphic objects as well. Generation thereof is not limited to the process depicted in FIG. 16.

Interrelation of Digital Objects

In some embodiments digital objects interrelate and have functionality with one another. Described below are a number of embodiments of interrelation:

A) a first digital object is enabled to generate further derivative digital objects. The derivative digital objects may be distributed at will, but if the first digital object changes possession, all derivative digital objects deactivate. For purposes of this disclosure and other examples, the term "Deactivate" refers to any of: losing all functionality, losing any user decipherable representation, and/or being deleted. Various embodiments implement deactivation either through internal programing of the digital object, or as conditions within a smart contract the digital object is associated with. A user decipherable representation refers to visual representations or data that is intended to be read by humans (e.g., not hash values). Examples include identity data that identifies the owner of the digital object.

B) a first digital object is an NFT and is associated with a cryptographic wallet. Contents of the cryptographic wallet are used as the input used to generate the first digital object. Where any of the original input are transferred away from the cryptographic wallet, the first digital object is deactivated.

C) a first digital object is an NFT and is associated with a cryptographic wallet. Contents of the cryptographic wallet are used as the input used to generate the first digital object. Where the first digital object is transferred away from the cryptographic wallet, the first digital object is deactivated.

D) a first digital object is an NFT and is associated with a cryptographic wallet. Contents of the cryptographic wallet are used as the input used to generate the first digital object. Where the content of the cryptographic wallet changes, data associated with the digital object also changes. For example, where a new NFT is added to the cryptographic wallet, a visual representation of the digital object is updated to include reference to or elements of the new NFT that has been added. The update to the digital object enables the digital object to evolve as changes occur to the cryptographic wallet.

In some embodiments of the evolving digital object, the digital object generation platform is executed subsequent times to modify the original digital object. The input scheme of evolving digital objects accommodates multiple schema. For example, in some embodiments, the visual representation of the digital object is remade from the current existing input (e.g., deleted and re-created). In other embodiments, the existing visual representation is used as a base element that is modified or embellished based on the changes to the cryptographic wallet. Where the existing visual representation is used as a base element, additional weight is given to the existing visual representation in the machine learning models such that the output remains recognizable as having originated from the base element.

In each of the examples above, some alternate embodiments replace deactivation with a broader modification. For example, some or part of the human decipherable content is deleted or changed. Where the digital object carried identity information, the visual representation may remain, but the identity portion may be deleted or updated to a new owner.

Where the digital object is an NFT that is modified, the changes to the NFT occur in the smart contract from which the NFT is associated. Changes to the visual representation or other data associated with the NFT are based on how the smart contract encodes cryptographic data of the NFT to human decipherable components. Where human decipherable elements are modified, no change need by made to cryptographic elements of the NFT. Where cryptographic elements of the NFT are changed, those changes are based upon conditions precedent within the smart contract (e.g., a process for revocation of a cryptographic token).

Computing Platform

Figure 17:
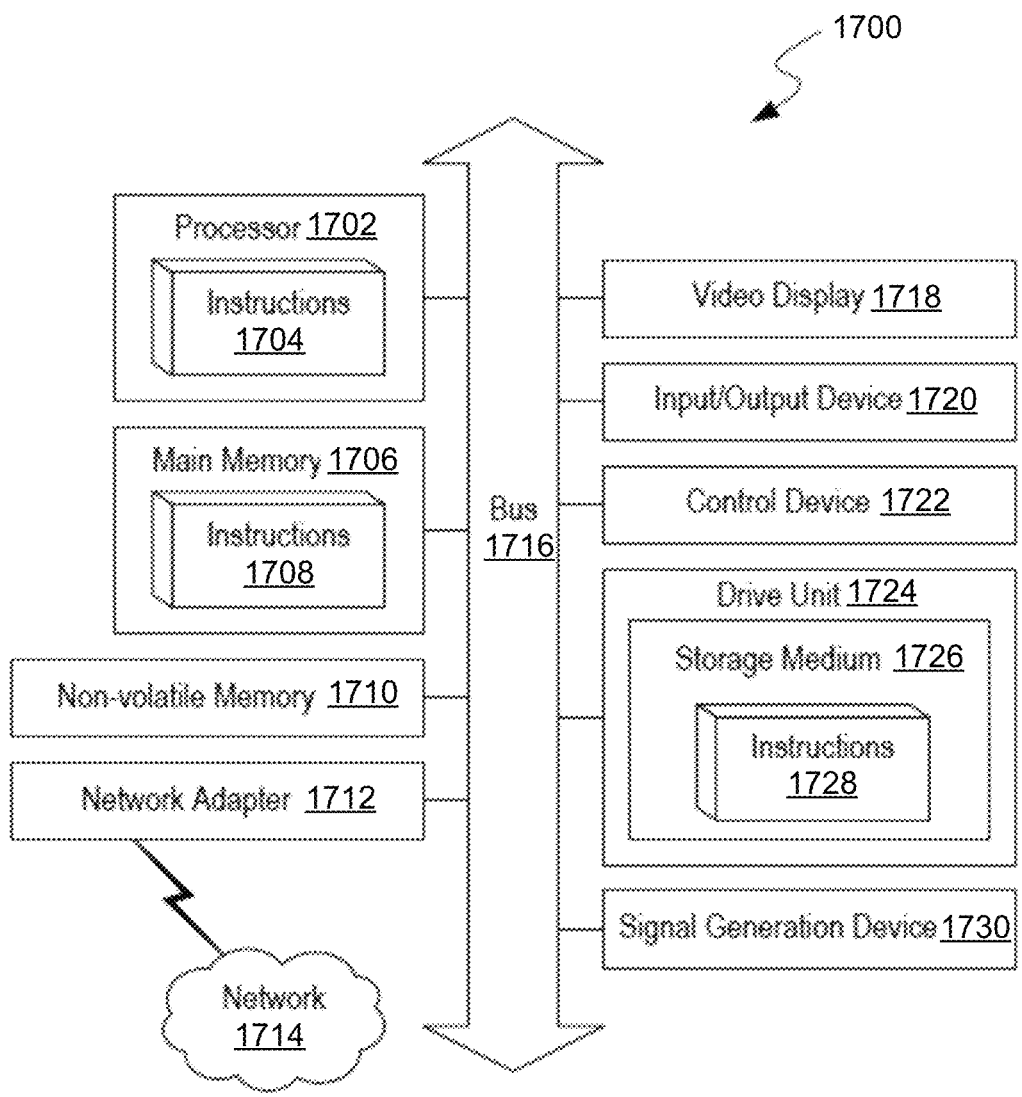
FIG. 17 is a block diagram of an exemplary computing system.

FIG. 17 is a block diagram illustrating an example computer system 1700, in accordance with one or more embodiments. In some embodiments, components of the example computer system 1700 are used to implement the software platforms described herein. At least some operations described herein can be implemented on the computer system 1700.

The computer system 1700 can include one or more central processing units ("processors") 1702, main memory 1706, non-volatile memory 1710, network adapters 1712 (e.g., network interface), video displays 1718, input/output devices 1720, control devices 1722 (e.g., keyboard and pointing devices), drive units 1724 including a storage medium 1726, and a signal generation device 1720 that are communicatively connected to a bus 1716. The bus 1716 is illustrated as an abstraction that represents one or more physical buses and/or point-to-point connections that are connected by appropriate bridges, adapters, or controllers. The bus 1716, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computer system 1700 can share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 1700.

While the main memory 1706, non-volatile memory 1710, and storage medium 1726 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1728. The term "machine-readable medium" and "storage medium" shall also be taken to include any medium that is capable of storing, encoding, or carrying a set of instructions for execution by the computer system 1700. In some embodiments, the non-volatile memory 1710 or the storage medium 1726 is a non-transitory, computer-readable storage medium storing computer instructions, which can be executed by the one or more central processing units ("processors") 1702 to perform functions of the embodiments disclosed herein.

In general, the routines executed to implement the embodiments of the disclosure can be implemented as part of an operating system or a specific application, component, program, object, module, or sequence of instructions (collectively referred to as "computer programs"). The computer programs typically include one or more instructions (e.g., instructions 1704, 1708, 1728) set at various times in various memory and storage devices in a computer device. When read and executed by the one or more processors 1702, the instruction(s) cause the computer system 1700 to perform operations to execute elements involving the various aspects of the disclosure.

Moreover, while embodiments have been described in the context of fully functioning computer devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 1710, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 1712 enables the computer system 1700 to mediate data in a network 1714 with an entity that is external to the computer system 1700 through any communication protocol supported by the computer system 1700 and the external entity. The network adapter 1712 can include a network adapter card, a wireless network interface card, a router, an access point, a wireless router, a switch, a multilayer switch, a protocol converter, a gateway, a bridge, a bridge router, a hub, a digital media receiver, and/or a repeater.

The network adapter 1712 can include a firewall that governs and/or manages permission to access proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall can additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc. A portion of the methods described herein can be performed using the example ML system 1800 illustrated and described in more detail with reference to FIG. 18.

Machine Learning System

Figure 18:
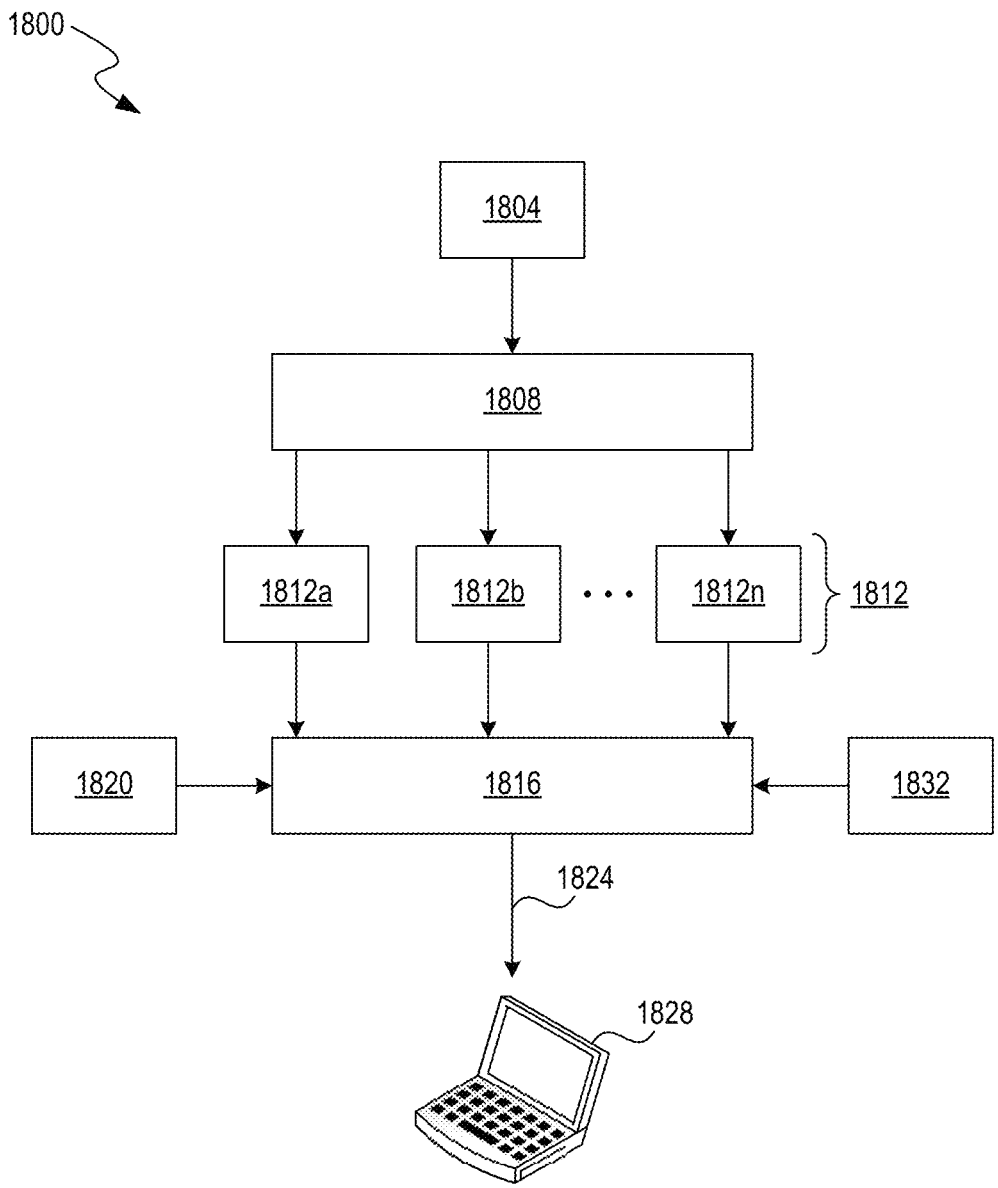
FIG. 18 is a block diagram illustrating an example machine learning (ML) system, in accordance with one or more embodiments

FIG. 18 is a block diagram illustrating an example ML system 1800, in accordance with one or more embodiments. The ML system 1800 is implemented using components of the example computer system 1700 illustrated and described in more detail with reference to FIG. 9. Likewise, embodiments of the ML system 1800 can include different and/or additional components or be connected in different ways. The ML system 1800 is sometimes referred to as a ML module.

The ML system 1800 includes a feature extraction module 1808 implemented using components of the example computer system 1700 illustrated and described in more detail with reference to FIG. 17. In some embodiments, the feature extraction module 1808 extracts a feature vector 1812 from input data 1804. For example, the input data 1804 can include one or more images, sets of text, audio files, or video files. The feature vector 1812 includes features 1812*a*, 1812*b*, . . . 1812*n*. The feature extraction module 1808 reduces the redundancy in the input data 1804, e.g., repetitive data values, to transform the input data 1804 into the reduced set of features 1812, e.g., features 1812*a*, 1812*b*, . . . 1812*n*. The feature vector 1812 contains the relevant information from the input data 1804, such that events or data value thresholds of interest can be identified by the ML model 1816 by using this reduced representation. In some example embodiments, dimensionality reduction techniques, such as principal component analysis (PCA) or autoencoders are used by the feature extraction module 1808.

In alternate embodiments, the ML model 1816 performs deep learning (also known as deep structured learning or hierarchical learning) directly on the input data 1804 to learn data representations, as opposed to using task-specific algorithms. In deep learning, no explicit feature extraction is performed; the features 1812 are implicitly extracted by the ML system 1800. For example, the ML model 1816 can use a cascade of multiple layers of nonlinear processing units for implicit feature extraction and transformation. Each successive layer uses the output from the previous layer as input. The ML model 1816 can learn in supervised (e.g., classification) and/or unsupervised (e.g., pattern analysis) modes. The ML model 1816 can learn multiple levels of representations that correspond to different levels of abstraction, wherein the different levels form a hierarchy of concepts. In this manner, the ML model 1816 can be configured to differentiate features of interest from background features.

In alternative example embodiments, the ML model 1816, e.g., in the form of a CNN generates the output 1824, without the need for feature extraction, directly from the input data 1804. The output 1824 is provided to the computer device 1828. The computer device 1828 is a server, computer, tablet, smartphone, smart speaker, etc., implemented using components of the example computer system 1700 illustrated and described in more detail with reference to FIG. 17. In some embodiments, the steps performed by the ML system 1800 are stored in memory on the computer device 1828 for execution. In other embodiments, the output 1824 is displayed on high-definition monitors.

A CNN is a type of feed-forward artificial neural network in which the connectivity pattern between its neurons is inspired by the organization of a visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation. CNNs are based on biological processes and are variations of multilayer perceptrons designed to use minimal amounts of preprocessing.

The ML model 1816 can be a CNN that includes both convolutional layers and max pooling layers. The architecture of the ML model 1816 can be "fully convolutional," which means that variable sized sensor data vectors can be fed into it. For all convolutional layers, the ML model 1816 can specify a kernel size, a stride of the convolution, and an amount of zero padding applied to the input of that layer. For the pooling layers, the ML model 1816 can specify the kernel size and stride of the pooling.

In some embodiments, the ML system 1800 trains the ML model 1816, based on the training data 1820, to correlate the feature vector 1812 to expected outputs in the training data 1820. As part of the training of the ML model 1816, the ML system 1800 forms a training set of features and training labels by identifying a positive training set of features that have been determined to have a desired property in question and a negative training set of features that lack the property in question. The ML system 1800 applies ML techniques to train the ML model 1816, that when applied to the feature vector 1812, outputs indications of whether the feature vector 1812 has an associated desired property or properties.

The ML system 1800 can use supervised ML to train the ML model 1816, with features from the training sets serving as the inputs. In some embodiments, different ML techniques, such as support vector machine (SVM), regression, naïve Bayes, random forests, neural networks, etc., are used. In some example embodiments, a validation set 1832 is formed of additional features, other than those in the training data 1820, which have already been determined to have or to lack the property in question. The ML system 1800 applies the trained ML model 1816 to the features of the validation set 1832 to quantify the accuracy of the ML model 1816. In some embodiments, the ML system 1800 iteratively re-trains the ML model 1816 until the occurrence of a stopping condition, such as the accuracy measurement indication that the ML model 1816 is sufficiently accurate, or a number of training rounds having taken place.

The description and drawings herein are illustrative and are not to be construed as limiting. Numerous specific details are described to provide a thorough understanding of the disclosure. However, in certain instances, well-known details are not described in order to avoid obscuring the description. Further, various modifications can be made without deviating from the scope of the embodiments.

Consequently, alternative language and synonyms can be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

It is to be understood that the embodiments and variations shown and described herein are merely illustrative of the principles of this invention and that various modifications can be implemented by those skilled in the art.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method of generating a digital user avatar associated with an entertainment platform that includes a rotating 3D shape that implements visual representations of cryptographic objects on each side of the rotating 3D shape, the method comprising:

receiving a first token that links to a first image and a second token that links to a second image that are determined by a first user, wherein the first token and the second token are part of a set of cryptographic objects that is associated with a cryptographic wallet to the first user on the entertainment platform;

generating a digital 3D shape including a plurality of surface regions, wherein each region is a bounded field upon which user determined image data is positioned;

linking the first image to a first surface region of the digital 3D shape and the second image to a second surface region of the digital 3D shape as configured to convey identity in a social networking platform, wherein the first image and the second image are visual representations of the cryptographic objects;

rendering the digital 3D shape including the first image and the second image in respective linked surface regions in an avatar space of the first user on the entertainment platform; and establishing a cycling scheme between each image linked to the plurality of surface regions.

2. A method of generating a digital user avatar associated with an entertainment platform comprising:

receiving a first token that links to a first image and a second token that links to a second image that are determined by a user, the first image and the second image being part of user determined image data that is a representation of a user profile of the user;

generating a digital 3D shape including a plurality of surface regions, wherein each surface region is a bounded field upon which the user determined image data is positioned;

linking the first image to a first surface region of the digital 3D shape and the second image to a second surface region of the digital 3D shape; and rendering the digital 3D shape including the first image and the second image in respective linked surface regions in an avatar space of the user on the entertainment platform.

3. The method of claim 2, further comprising:
establishing a cycling scheme between each image linked to the plurality of surface regions, the cycling scheme controls any combination of:
a length of time a given image linked to the digital 3D shape appears in view on a 2D plane;
a frequency the given image linked to the digital 3D shape appears in view on a 2D plane;
an order that the user provided image data linked to the digital 3D shape appears in view on a 2D plane; or
a rotation direction of the digital 3D shape.

4. The method of claim 2, further comprising:
providing an orbit region associated with the digital 3D shape, the orbit region is a field wherein user determined visual elements are applied;
linking a first visual element to the orbit region; and
rendering the first visual element in the orbit region, wherein the first visual element is displayed as traversing an exterior area about the digital 3D shape.

5. The method of claim 2, wherein the first image and the second image are configured to convey identity in a social networking platform.

6. The method of claim 2, wherein the first image is a 3D image and said rendering of the first image extending outward from a surface of the digital 3D shape.

7. The method of claim 2, further comprising:
associating a cryptographic wallet to the user on the entertainment platform, wherein the cryptographic wallet is associated with a set of cryptographic objects each including a visual representation;
wherein said linking uses the visual representations of the set of cryptographic objects as the first image and the second image.

8. The method of claim 7, wherein said associating further includes verification that the user has a private cryptographic key associated with the cryptographic wallet.

9. A system of generating a digital user avatar associated with an entertainment platform comprising:
a processor; and
a memory including instructions that when executed cause the processor to:
receive a first token that links to a first image and a second token that links to a second image that are determined by a user, the first image and the second image being part of user determined image data that is a representation of a user profile of the user;
generate a digital 3D shape including a plurality of surface regions, wherein each surface region is a bounded field upon which the user determined image data is positioned;
link the first image to a first surface region of the digital 3D shape and the second image to a second surface region of the digital 3D shape; and
render the digital 3D shape including the first image and the second image in respective linked surface regions in an avatar space of the user on the entertainment platform.

10. The system of claim 9, wherein the processor is further configured to:
establish a cycling scheme between each image linked to the plurality of surface regions, the cycling scheme controls any combination of:
a length of time a given image linked to the digital 3D shape appears in view on a 2D plane;
a frequency the given image linked to the digital 3D shape appears in view on a 2D plane;
an order that the user provided image data linked to the digital 3D shape appears in view on a 2D plane; or
a rotation direction of the digital 3D shape.

11. The system of claim 9, wherein the processor is further configured to:
provide an orbit region associated with the digital 3D shape, the orbit region is a field wherein user determined visual elements are applied;
link a first visual element to the orbit region; and
render the first visual element in the orbit region, wherein the first visual element is displayed as traversing an exterior area about the digital 3D shape.

12. The system of claim 9, wherein the first image and the second image are configured to convey identity in a social networking platform.

13. The system of claim 9, wherein the first image is a 3D image and said rendering of the first image extending outward from the first surface region of the digital 3D shape.

14. The system of claim 9, wherein the processor is further configured to:
associate a cryptographic wallet to the user on the entertainment platform, wherein the cryptographic wallet is associated with a set of cryptographic objects each including a visual representation;
wherein said linking uses the visual representations of the set of cryptographic objects as the first image and the second image.

15. The system of claim 14, wherein the processor is configured to associate the cryptographic wallet by verification that the user has a private cryptographic key associated with the cryptographic wallet.

16. A non-transitory computer-readable medium having executable instructions stored thereon that for generating a digital user avatar associated with an entertainment platform, that when executed by one or more processors, configure the one or more processors to:
receive a first token that links to a first image and a second token that links to a second image that are determined by a user, the first image and the second image being part of user determined image data that is a representation of a user profile of the user;
generate a digital 3D shape including a plurality of surface regions, wherein each surface region is a bounded field upon which the user determined image data is positioned;
link the first image to a first surface region of the digital 3D shape and the second image to a second surface region of the digital 3D shape; and
render the digital 3D shape including the first image and the second image in respective linked surface regions in an avatar space of the user on the entertainment platform.

17. The non-transitory computer-readable medium of claim 16, wherein the executable instructions, upon execution, further configure the one or more processors to:
establish a cycling scheme between each image linked to the plurality of surface regions, the cycling scheme controls any combination of:
a length of time a given image linked to the digital 3D shape appears in view on a 2D plane;
a frequency the given image linked to the digital 3D shape appears in view on a 2D plane;

an order that the user provided image data linked to the digital 3D shape appears in view on a 2D plane; or a rotation direction of the digital 3D shape.

18. The non-transitory computer-readable medium of claim 16, wherein the executable instructions, upon execution, further configure the one or more processors to:

provide an orbit region associated with the digital 3D shape, the orbit region is a field wherein user determined visual elements are applied;

link a first visual element to the orbit region; and render the first visual element in the orbit region, wherein the first visual element is displayed as traversing an exterior area about the digital 3D shape.

19. The non-transitory computer-readable medium of claim 16, wherein the first image and the second image are configured to convey identity in a social networking platform.

20. The non-transitory computer-readable medium of claim 16, wherein the first image is a 3D image and said rendering of the first image extending outward from the first surface region of the digital 3D shape.

21. The non-transitory computer-readable medium of claim 16, wherein the executable instructions, upon execution, further configure the one or more processors to:

associate a cryptographic wallet to the user on the entertainment platform, wherein the cryptographic wallet is associated with a set of cryptographic objects each including a visual representation;

wherein said linking uses the visual representations of the set of cryptographic objects as the first image and the second image.

22. The non-transitory computer-readable medium of claim 21, wherein the executable instructions configure the one or more processors to associated the cryptographic wallet by verification that the user has a private cryptographic key associated with the cryptographic wallet.

\* \* \* \* \*